United States Patent [19]
Cobb et al.

[11] Patent Number: 4,791,666
[45] Date of Patent: Dec. 13, 1988

[54] AUTOMATIC INTERCEPT SYSTEM INTERFACE FOR ELECTROMECHANICAL TELEPHONE CENTRAL OFFICE

[75] Inventors: Douglas R. Cobb, Dunwoody; David K. Glisson, Suwannee; Raymond C. Fields, Roswell; Kenneth L. Cook, Lawrenceville, all of Ga.

[73] Assignee: The Audichron Company, Atlanta, Ga.

[21] Appl. No.: 65,018

[22] Filed: Jun. 19, 1987

[51] Int. Cl.⁴ .............................................. H04M 3/52
[52] U.S. Cl. ....................................... 379/213; 379/84
[58] Field of Search ................ 379/213, 88, 210, 214, 379/84, 67, 12, 22, 29

[56] References Cited

U.S. PATENT DOCUMENTS 3,894,193  7/1975  Puranik et al. ................ 379/213 X
4,446,337  5/1984  Cofer ................................. 379/207

OTHER PUBLICATIONS

*Notes on the Network*, AT&T, 1980, pp. 12–14 of Section 4, pp. 82–88 and 101–103 of Section 5, pp. 9–11 of Section 8.

*Primary Examiner*—James L. Dwyer
*Attorney, Agent, or Firm*—Jones, Askew & Lunsford

[57] ABSTRACT

A method and apparatus for connecting an electromechanical telephone central office having a step-by-step or cross bar type switching equipment to a remotely located automatic intercept message system. The terminating sleeve leads of a plurality of subscriber telephone numbers are connected to a scanner circuit. The sleeve leads correlate to preassigned telephone numbers and are continuously scanned for seizure. Upon detection of a service request to a disconnected or changed telephone number, the scanner seizes an outgoing trunk to a distant automatic intercept message playback system. When the outgoing trunk has been seized and a connection made to the AIS, a multifrequency spill of the telephone number which has been changed or disconnected is provided to the AIS, which in response provides an appropriate intercept message back over the trunk and is connected to the calling party. The system is microprocessor controlled, and contains a data base associating sleeve numbers with telephone numbers which form the multifrequency spill. The system makes changed number referral automatic and obviates the use of operators for providing operator number identification. A conventional DTMF telephone is employed for programming the telephone numbers and sleeve leads.

36 Claims, 9 Drawing Sheets

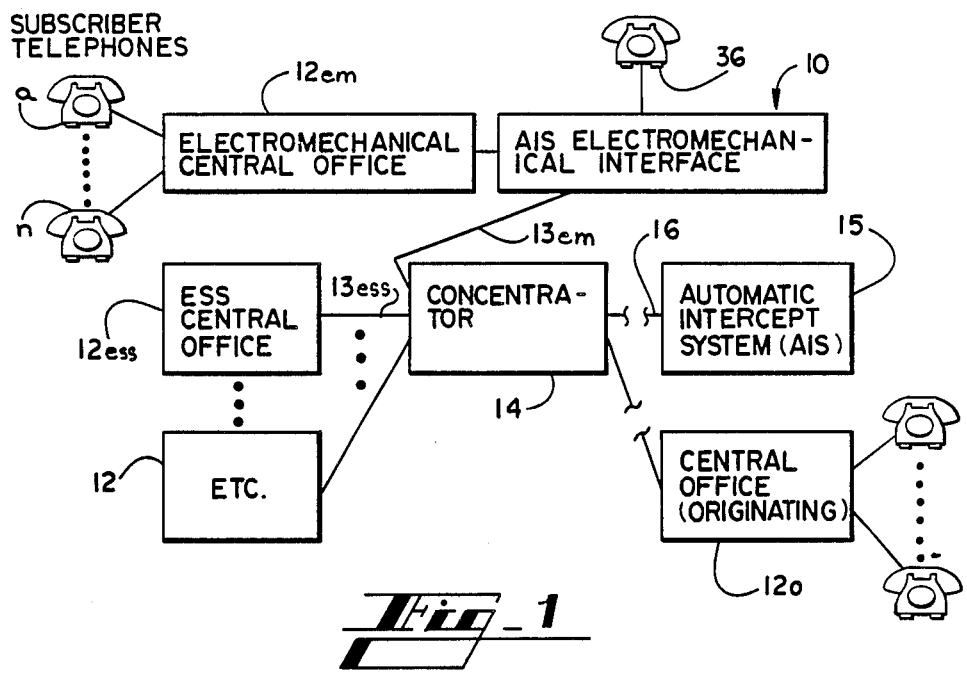
_Fig_1
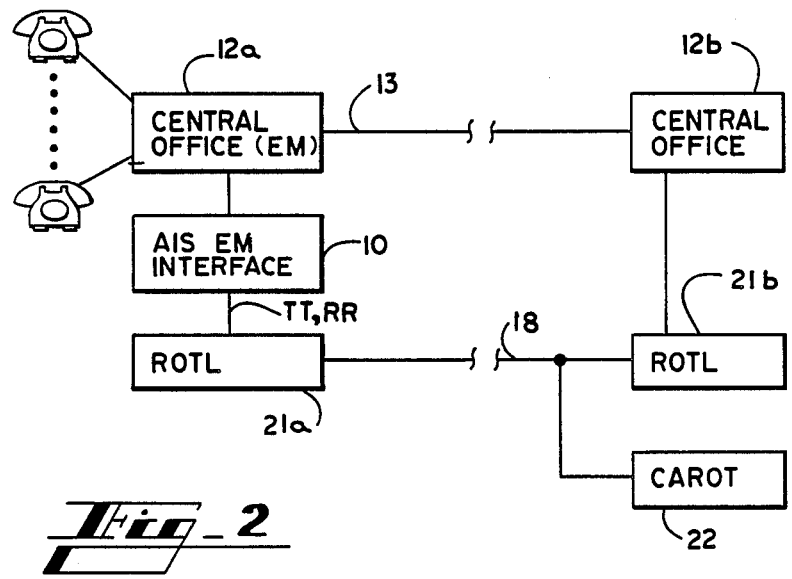
_Fig_2

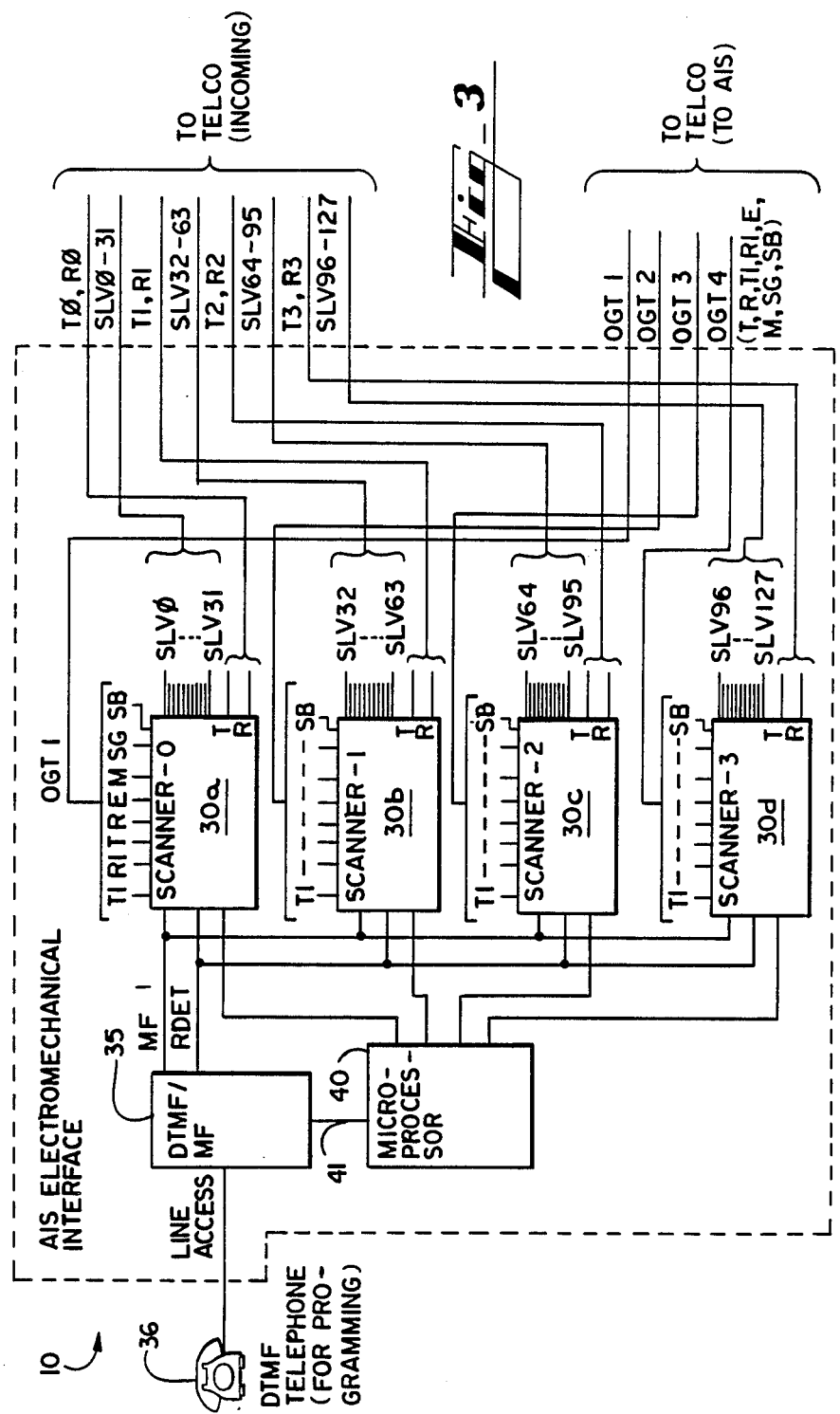

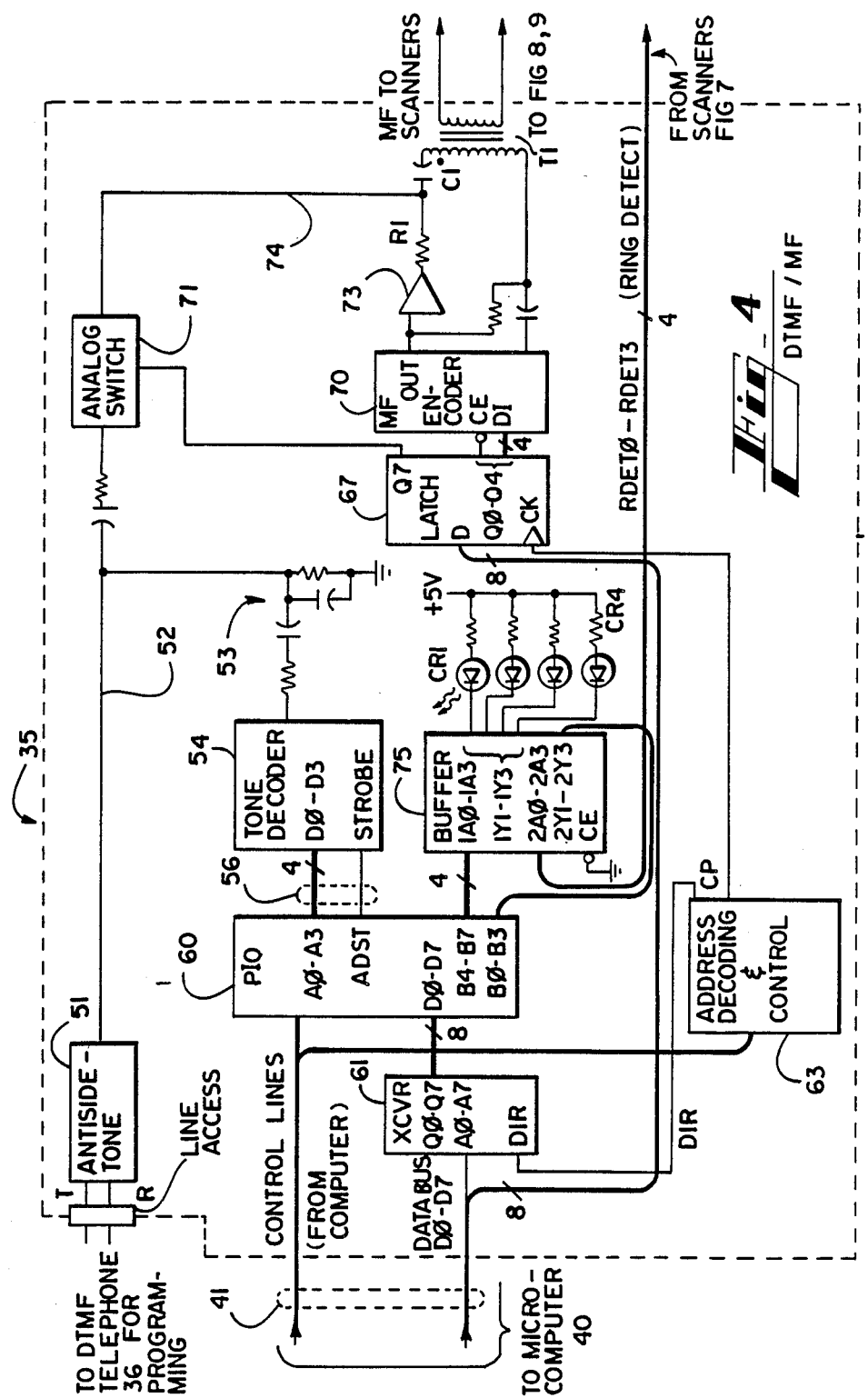
Fig. 4 DTMF/MF

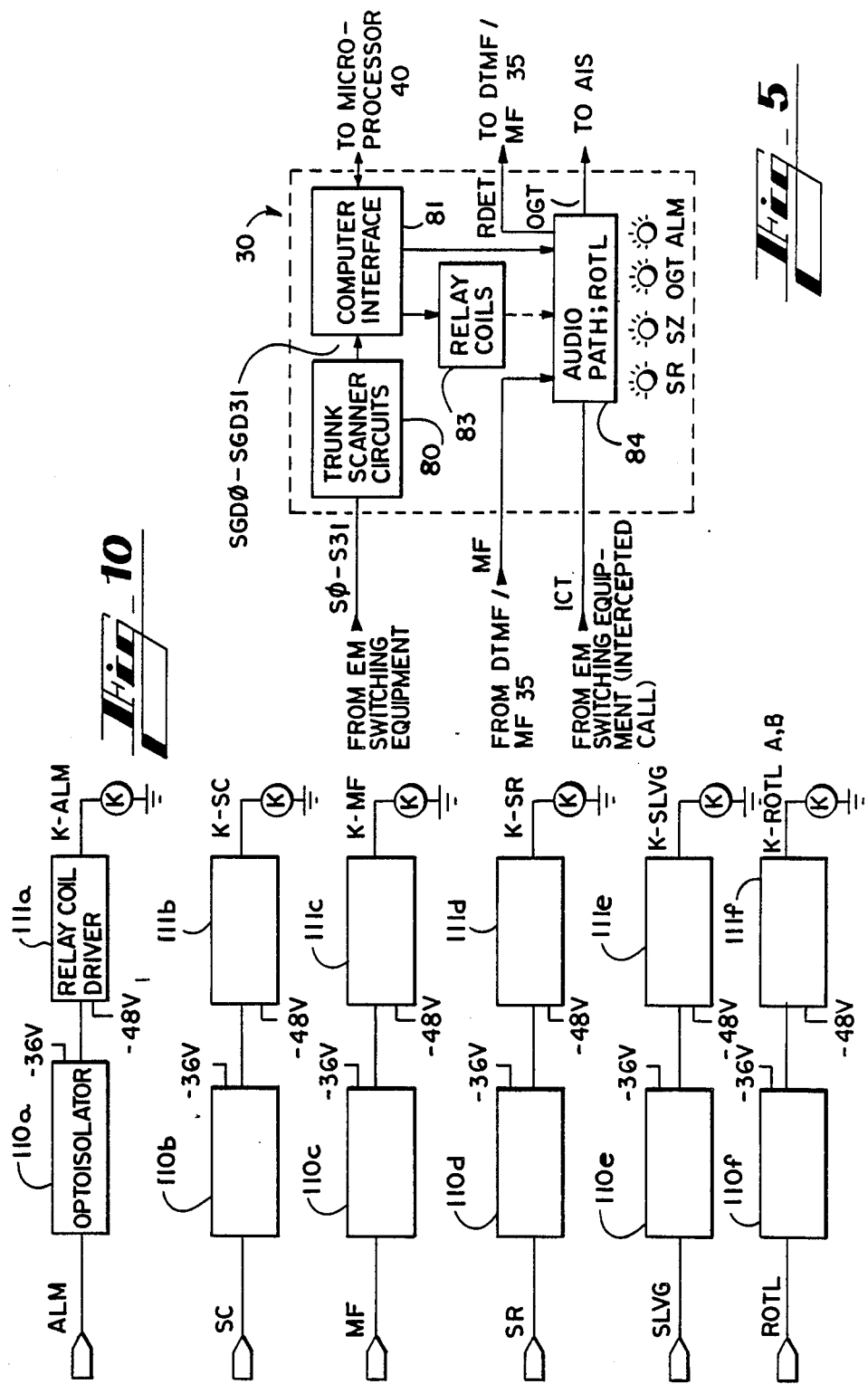

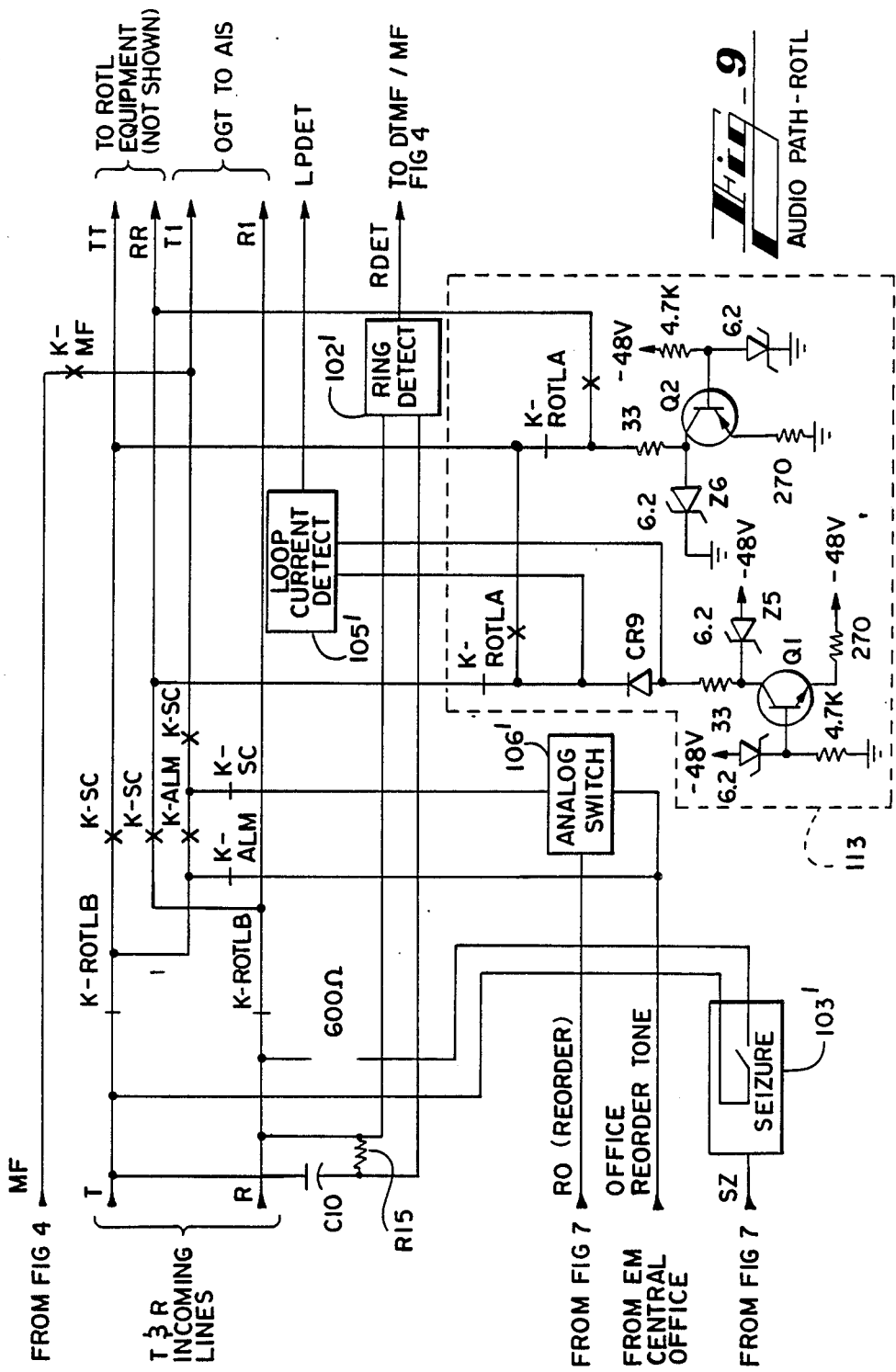

GENERAL PROGRAM FLOW

4,791,666

AUTOMATIC INTERCEPT SYSTEM INTERFACE FOR ELECTROMECHANICAL TELEPHONE CENTRAL OFFICE

TECHNICAL FIELD

The present invention relates generally to telephony and central office switching equipment, and more particularly relates to a system for interfacing an electromechanical central office to a remotely located automatic intercept system (AIS) for delivering intercept messages when a call placed from an originating telephone office cannot be completed.

BACKGROUND OF THE INVENTION

The use of intercept messages to explain why a call cannot be completed is known in telephony. Such intercept messages are typically initiated whenever an outgoing call cannot be completed for various reasons, such as the called number being out of service, changed, or not being a working number. The person who made the call receives a recorded audio message advising that the call was not completed as dialed.

Intercept messages according to the known prior art are typically delivered at the switching office where the need for intercept has been detected, usually the central office where the dialed number would have been connected as a subscriber. The appropriate intercept message is returned along a trunk circuit to the originating office, so that the calling party can receive the message.

Despite the widespread acceptance of electronic switching systems (ESS) for central offices, there are still a number of central offices employing electromechanical switching equipment such as step by step or crossbar type switches. These types of central offices are often associated with smaller, non-Bell System local operating companies, as well as Bell operating companies. Traditionally, electromechanical (EM) central offices have relied upon use of operator intervention to tell a calling party that the called number has been changed to a new number. This is called ONI, for operator number identification. Alternatively, some EM offices use a fixed message intercept machine, wherein all intercepted calls receive the same predetermined generic announcement that a number has been changed, without providing the calling party with the new number. In the case of the fixed message intercept machine, the calling party must call directory assistance to obtain the new number.

There are commercially available changed-number intercept systems, also known as "automatic intercept systems" (AIS) for modern digital electronic switching system (ESS) central offices, such as the type IIS intercept system manufactured by The Audichron Company, Atlanta, GA, assignee of the present invention. Modern AIS are responsive to a multifrequency (MF) digit stream containing the digits of the called telephone number, and provide an intercept message appropriate for that number, e.g., that it is out of service, or has been changed to a new number (which is then provided in audio form to the calling party). A particular difficulty in providing changed number intercept for EM offices is that there is no apparatus for identifying the called telephone number for the AIS. Thus, most EM central offices cannot provide automatic number identification (ANI) for intercepted calls, and must still rely on operator intervention for ONI.

As telephone companies having EM central offices grow, they are upgrading their systems to ESS type central office equipment. However, this type of equipment is expensive. Moreover, a network having some ESS switching equipment and some EM switching equipment in satellite central offices sometimes is incompatible. Often, the ESS will have ANI intercept equipment such as the AIS, which may provide considerable excess intercept handling capability. This intercept capability cannot be fully used until the satellite central offices are upgraded to ESS type equipment. While the ESS equipment is readily able to work with its own AIS, it is less than desirable to provide some customers with ANI but others with ONI. It would be preferable to have a low cost, intermediate method for providing ANI for satellite EM central offices, without requiring that the smaller telephone company upgrade all its central offices to ESS at once. Such is provided in the present invention.

SUMMARY OF THE INVENTION

The present invention provides a system for interfacing an electromechanical (EM) central office having step-by-step (S×S) or crossbar type switching equipment to a modern remotely located digital changed number intercept such as AIS or Audichron's IIS intercept systems. The disclosed embodiment provides changed-number intercept for EM switching system telephone central offices. Other intercept systems which are compatible with Bell Standards can be interfaced as the preferred embodiment offers several signaling options.

Briefly described, the present invention provides a method and apparatus for connecting an EM central office to a remotely located AIS for delivery of an intercept message. The preferred system connects to a plurality of terminating sleeve leads. Sleeve leads correlate to preassigned telephone numbers for which an intercept message is to be delivered when a calling party calls the number; the correlation is stored in memory of a microprocessor. The sleeve leads are continuously scanned for seizure. When a seizure is detected, an outgoing trunk is attached and the corresponding phone number is retrieved from memory and send out to a distant automatic intercept system via multifrequency signalling. In this manner, the EM central office employing the present invention can save the expense of an operator for handling ONI traffic. It provides ANI, that is, "automatic number identification", to a remotely located AIS to provide the changed number information to the calling party.

More particularly described, within the electromechanical office, the preferred embodiment connects to a maximum of 128 terminating sleeve leads. These leads correlate to pre-assigned telephone numbers stored in the system's database and are continuously scanned for seizure. Normally, when a seizure is detected, all other sleeves are made busy by application of ground, and an outgoing trunk is attached which, in turn, outpulses the appropriate telephone number in multifrequency form to the remote or local intercept system. Thus, means are provided for generating multifrequency signals corresponding to the telephone number via the outgoing trunk.

Programming of a disconnected or changed telephone number and sleeve assignments is performed locally using a standard 2500 type DTMF telephone equipped with an RJ11C male connector. An operator employs the keypad of the DTMF to key in the sleeve number followed by the telephone number associated with the sleeve. These numbers may be verified or changed as desired.

The preferred embodiment may be equipped with up to four scanner circuits, each capable of scanning 32 sleeve leads for the presence of ground which indicates a seizure. Each scanner also contains one outgoing trunk (OGT) circuit which interfaces to the remote (or local) digital intercept system. Provisions are made for loop signaling or E&M signaling types I to V. The system is compatible with either WINK-START or DELAY-DIAL. DELAY-DIAL is compatible up to 5 seconds in duration.

The option of charge and no-charge supervision is available to the local central office. When a seizure is detected, all remaining sleeve leads associated with the serving scanner are grounded to make them busy. The tips and rings from each associated sleeve termination are connected together, so that only one call can be served in each scanner at one time.

Outgoing trunks may be concentrated such that one trunk serves more than one scanner. Concentration configuration options are selected by dip-switches on the microcomputer circuit. When OGT's are concentrated, their outputs are physically wired together. LED indicators on each trunk indicate call progress and alarm status.

DTMF/MF circuit comprising a DTMF receiver is provided for decoding the tones generated by the programming telephone. A multifrequency (MF) generator circuit outpulses the dialed telephone number associated with sleeve leads which reside in the system database over the seized OGT. The DTMF/MF circuit has LED indicators which illuminate when a seizure is present on any scanner circuit.

A microprocessor circuit provides the program software and control of the preferred system, utilizing a 4 mHz Z80-A CPU. The circuit also provides memory capacity in RAM for the database of changed or disconnected numbers associated with the sleeves.

Each outgoing trunk has eight leads: tip, ring, T1, R1, E, M, SG, and SB. Where trunks are concentrated, the leads are jumpered together. When the system is configured for ROTL compatibility, the SG lead is not used. SB is used for disconnect timer disable.

Advantageously, the disclosed embodiment of the present invention complies with LSSGR, local switching system generic requirements, published by the BELLCORE. Other advantages include the ability for a smaller non-Bell System telephone company (as well as Bell operating companies with electromechanical equipment) to phase in gradually to ESS from EM switching equipment. Conventionally, a telephone company which decides to employ an ESS would be forced to change all its local central offices to ESS to be compatible with commercially available AIS, or have the EM central offices continue to provide ONI for changed number intercepts. With the present invention, the telephone companies can selectively install ESS's in selected central offices, purchase and install an AIS for handling intercepts from these offices, and employ the present invention, which is inexpensive and simple, for the EM central offices for which it wishes to postpone the expense of upgrading to ESS.

Still further, use of the present invention allows the independent telephone companies to save the expense of leasing trunks to an operator station for providing ONI on intercept.

When the system is configured with trunk scanners which are compatible with CAROT testing (ROTL), TT and RR are inputs from the ROTL device, and seizure is forwarded to the distant end which will return a wink on the E lead. The wink is passed back to the ROTL in the form of battery reversal on the TT and RR leads. After receipt of the wink, the system will outpulse the telephone number which has been assigned to Sleeve 0. When answer supervision is returned from the distant end, polarity is reversed to the ROTL device. The test call may be terminated at either end by an on-hook transition. All sleeves are grounded while a test call is in progress.

Accordingly, it is an object of the present invention to provide an automatic intercept system interface for an electromechanical central office.

It is another object of the present invention to provide an intercept message method and apparatus for delivering intercept messages generated at a remotely located AIS to central offices which do not have intercept handling capability.

It is another object of the present invention to provide an EM central office the ability to generate automatic number identification (ANI) to a remotely located AIS.

It is another object of the present invention to provide an intercept message delivery method and apparatus which is low cost and will operate with the signalling methods found in EM central offices.

It is another object of the present invention to provide a low cost method and apparatus for allowing multiple central offices to utilize a remote AIS.

It is another object of the present invention to provide an intercept handling capability for EM central offices which is ROTL compatible.

It is another object of the present invention to provide enhanced changed-number intercept service to customers or subscribers connected to an EM central office.

It is another object of the present invention to provide a low cost electronic alternative to the expense of operator intervention for telephone companies having EM central offices.

Yet still further, it is an object of the present invention to allow a smaller telephone company to concentrate a plurality of satellite central offices to a single, centrally located AIS center.

These and other objects, and advantages of the present invention will be more clearly understood and appreciated from a review of the following detailed description of the preferred embodiment and by reference to the appended drawings and claims.

BRIEF DESCRIPTION OF THE DRAWINGS

FIG. 1 is a block diagram illustrating a telephone switching network having an EM central office and employing the preferred embodiment of the present invention to attach to a remote AIS.

FIG. 2 illustrates connection of ROTL equipment to the preferred embodiment of the present invention.

FIG. 3 is a block diagram of the preferred embodiment of an AIS EM office interface constructed in accordance with the present invention.

FIG. 4 is a detailed schematic diagram of the DTMF/MF circuit employed in the preferred embodiment illustrated in FIG. 3.

FIG. 5 is a block diagram of a scanner circuit employed in the preferred embodiment illustrated in FIG. 3.

FIG. 9 is a detailed schematic diagram of a ROTL-compatible and alternative audio path circuit utilized in the scanner circuit shown in FIG. 5.

FIG. 10 is a detailed schematic diagram of relay circuits utilized in the scanner circuit shown in FIG. 5.

DETAILED DESCRIPTION OF THE PREFERRED EMBODIMENT

Figure 6:
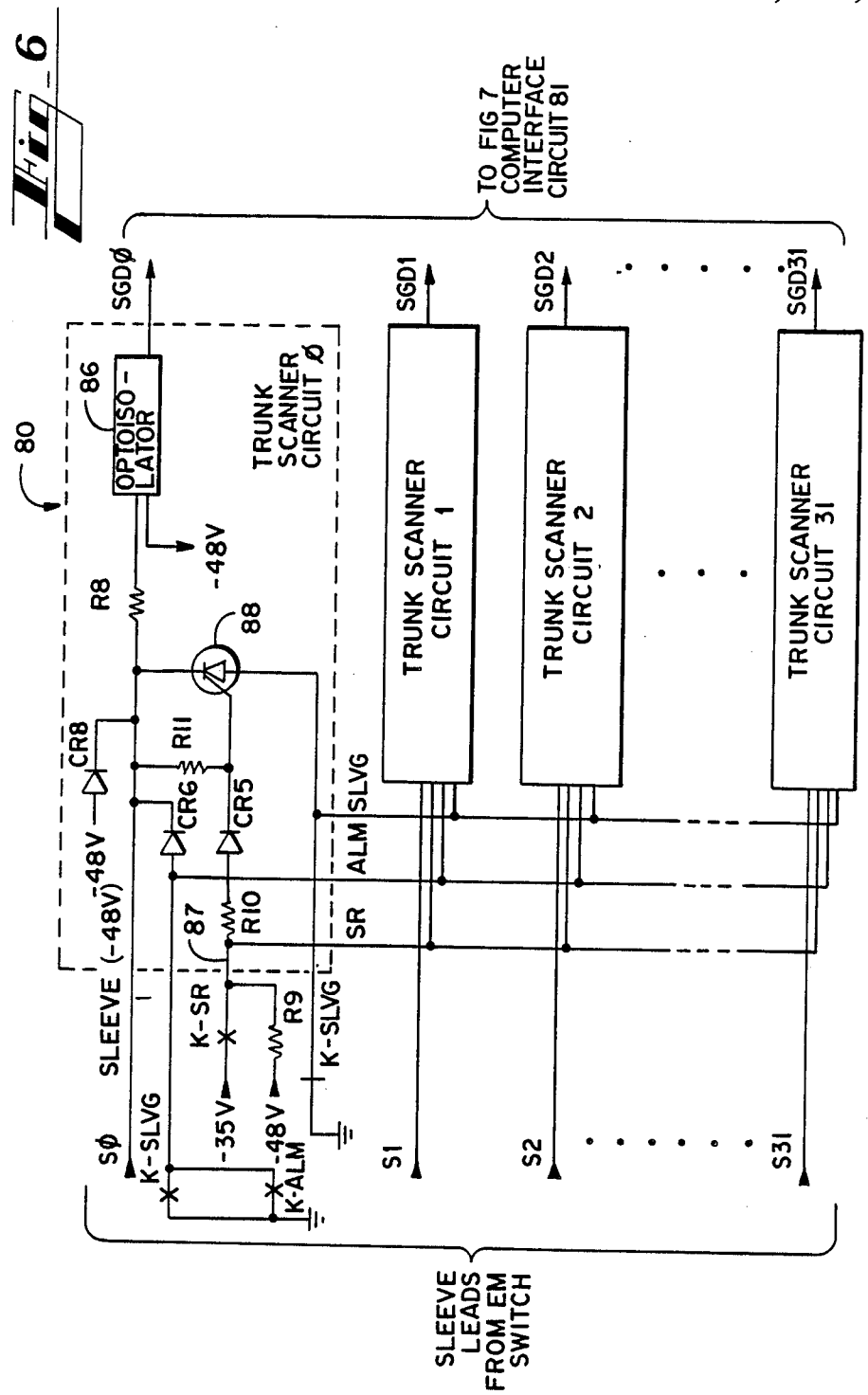
FIG. 6 is a detailed schematic diagram of a trunk scanner circuit utilized in the scanner circuit shown in FIG. 5.

Referring now to the drawings, in which like numerals indicate like elements throughout the several views, FIG. 1 illustrates a typical telephone network including a plurality of central offices 12, including an electromechanical (EM) type central office 12em and an electronic switching system (ESS) type central office 12ess being connected via trunks 13em and 13ess, respectively, to a concentrator 14. Concentrator 14 does not form a part of the present invention, but as will be known to those skilled in the art, a concentrator serves to provide a central connecting point from a plurality of trunks and provides a lesser number of outgoing trunks based on the probabilities of traffic on the trunks.

A preferred embodiment of an automatic intercept system interface 10 for the EM central office constructed in accordance with the present invention is connected between the EM central office 12em and the concentrator 14. However, it will be understood that a direct connection can be made between the AIS interface 10 and another central office, such as originating central office 12o at which a telephone call is originated to one of the subscriber numbers connected to the EM central office 12em. The AIS interface 10 connects a call originating at the central office 12o to an AIS 15 via an outgoing trunk 16.

The present invention of an AIS interface 10 accomplishes the above-stated objectives, as will be seen. One particular advantage obtained is enhanced changed-number intercept service to customers or subscribers connected to an EM central office. Moreover, the AIS interface saves the expense of operator intervention for telephone companies having EM central offices. Yet still further, the present invention allows the smaller telephone company to concentrate a plurality of satellite central offices to a single, centrally located AIS center.

Yet another advantage of the preferred embodiment is the ability to respond to automated trunk tests which may be periodically conducted by a larger telephone company. As will be known to those skilled in the art, Bell System Companies conduct tests which they term "centralized automatic routining (maintenance) of trunks", better known as "CAROT." These tests are implemented with "remote office test lines", known as "ROTL." The preferred embodiment of the present invention is ROTL-compatible. As illustrated in FIG. 2, the telephone trunk connection 13 between a pair of central offices 12a, 12b may be tested. A ROTL device 21a, 21b is connected to each respective central office. The ROTL devices 21a, 21b are connected via a ROTL test line 18, and both are controlled by the CAROT system 22. When the CAROT system conducts a test of the trunk 13, it sends commands to one of the ROTL devices such 21a, which dials a predetermined number at the central office 12b. This predetermined number constitutes a command to the central office 12b to connect its ROTL device 21b to the trunk 13. The two ROTL devices 21a, 21b then proceed to send a series of test tones in particular patterns, frequencies and levels, and the CAROT system monitors the transmission line parameters of the trunk 13.

An AIS interface 10 constructed in accordance with the present invention can handle up to four trunks. The ROTL device is attached permanently to the AIS interface as shown in FIG. 2, but remains idle most of the time. When ROTL is employed, it is attached to sleeve 0 of a scanner.

Before describing the preferred embodiment in detail, a bit more background will be provided. As will be known to those skilled in the art, in an EM central office, the incoming subscriber telephone lines typically consist of a tip (T) and ring (R) line, which are connected to a line circuit (not shown), and a sleeve lead. In the line circuit, there is an idle test or sleeve resistor connected to the EM switching equipment; the wire connected to this sleeve resistor is typically called a "sleeve lead". By monitoring the voltage level on the sleeve lead, the EM switching equipment can determine when a particular line has gone off hook or is in service. In most switching equipment, ground potential will appear on sleeve leads which are in service. The telephone equipment of a calling party attempting to connect to a line which is in service will be connected to the sleeve lead of the line and will "see" a ground there. It will then return a busy tone signal to the calling party in response thereto.

Also as will be known, a device known as a "connector" is provided in the typical EM central office, for serving up to one hundred telephone numbers. This connector serves as the line circuit point of termination of the telephone lines from the subscribers in the central office. The connector provides connection points for the T, R, and sleeve leads for each subscriber line. If a particular subscriber telephone number has been changed, disconnected, or is no longer in service, a worker will physically move the T, R, and sleeve lines associated with the particular number and swing it over to the AIS interface 10.

Preferred Hardware Configuration

Referring next to FIG. 3, the preferred AIS interface 10 is illustrated in somewhat more detail, in block diagram form. In the preferred embodiment, there are four scanner circuits 30a–30d, denominated SCANNER-0–SCANNER-3, each of which receives up to thirty-two sleeve leads from out-of-service or changed telephone numbers, and a paralleled connection of the T and R lines from these telephone numbers. Thus, the disclosed embodiment will handle 128 incoming lines from the central office and provides four outgoing trunks to the AIS. For example, lines T0, R0 carry the parallel connections of up to thirty two changed subscriber lines to SCANNER-0, and the individual sleeve connections SLV0-SLV31 of the same lines. When ROTL option is activated, the zero sleeve SLV0 is associated with the ROTL.

In like manner, lines T1, R1 carry the connections of an additional thirty-two changed lines to SCANNER-1, with associated individual sleeve leads SLV32-SLV63. A total of 128 changed or out-of-service numbers can be handled by the four scanners 30 in the AIS interface 10. Thus, the T and R provide an audio path, while the sleeve lead uniquely identifies the changed number to which a connection is being attempted.

Each scanner circuit board 30 plugs into a mother board (not shown) and accesses a group of 32 central office lines and one outgoing trunk. The tip and ring leads of such a group would typically be from a multiple on a central office distributing frame and the one resulting pair of each group is connected to the AIS interface 10. The sleeve leads are run independently to allow line identification and control. Only one line within a group is allowed intercept service at a time. When one line is identified, the sleeve leads of all other lines in the group are made busy by the present invention.

Each scanner 30 can thus serve a single telephone call at a time, and is connected to an outgoing trunk (OGT) for connection to a remotely located AIS. There are four OGT's labelled OGT1-OGT4 in FIG. 3; thus, the preferred embodiment can handle four simultaneous intercept calls.

The OGT's of the scanner circuits provide outputs T1, R1, T, R, E, M, SG, and SB which are leads for connection to the AIS and ROTL equipment), plus E&M signaling leads E and M. Additional outputs include signals SG for "signal ground" and SB for "signal battery"; in embodiments of the present invention configured for ROTL operation, the signal SB is employed for defeat of disconnect timers.

Each scanner is continuously scanning the sleeve leads connected to it, and will seize the first sleeve lead line it sees at ground. Upon seizure, all other sleeve leads are grounded, which will cause the central office to return a busy tone signal to any subsequent callers to a number connected to the particular scanner, until the scanner has completed its task and performed the AIS connection.

After ringing current is detected, a DC path is placed across the tip and ring leads to trip ringing. Depending on processor program options, this loop may be temporary or permanent to allow a non-charge or charge condition, respectively.

It should be understood that the scanners 30a-30d do not necessarily have to be connected to individual outgoing trunks. In the event that statistical traffic analysis indicates that fewer OGT's can serve a large number of changed numbers, then a plurality of scanners 30 can be connected in parallel to an outgoing trunk. For example, one could connect or concentrate two scanners in parallel to a single OGT, or could even concentrate all four scanners on a single OGT.

A microprocessor circuit 40 is employed as the central controller of the preferred AIS interface 10. While any of a number of different types of microcomputers would be suitable for operation in the present invention, a single board Z80 type microcomputer, manufactured by Zilog Corporation, including RAM, program ROM, peripheral input/out (PIO) circuits, counter/timer circuits (CTC), and DIP switches for configuring modes of operation, is employed in the preferred embodiment. Inasmuch as such microcomputer circuits and components are well known to those skilled in the art, no further discussion of the details of construction of such microcomputer boards will be provided herein, other than to indicate that the standard connections of control lines, address lines, and data bus lines may be connected to various other circuit components to be described later. Details of the program for driving the microcomputer 40 are also provided hereinbelow. The microcomputer 40 is connected to a DTMF and MF sender circuit 35 and each of the scanners 30a-30d.

When the connection is set to a distant AIS, and the AIS is ready to receive data, it returns a nominal 200 mS wink signal, detected by the E lead. Following receipt of this signal pulse, the microprocessor causes the MF sender to output line identification data to the AIS for the line being served.

Upon receipt of the line identification, the AIS is ready to start its intercept message. In the event that answer supervision is enabled (with a dip switch, not shown, associated with the microprocessor), the AIS will return answer supervision (E lead active). Recognition of answer supervision by the system indicates to the microprocessor 40 that the MF sender 35 may be disconnected, and the calling line connected to the outgoing trunk to receive the intercept message. At the end of the message, the AIS returns disconnect supervision (E lead inactive), if appropriate; otherwise, an appropriate time-out period signifying the end of the message will expire. The trunk scanner 30 is then returned to normal to serve further requests for service.

The disclosed AIS interface 10 is typically configured to operate with standard E&M signalling, that is, it originates a seizure of an OGT connected to a scanner, acknowledges a wink signal received from an office having an AIS attached, and proceeds to provide an MF spill of the disconnected or changed number to the AIS for an intercept message. The MF spill comprises KP-XXX-XXXX-ST, where KP is the standard keypulse signal, XXX-XXXX are the digits of the intercepted call, and ST is the start signal.

Still referring to FIG. 3, a dual tone multifrequency (DTMF) and multi-frequency (MF) circuit 35, DTMF/MF, is connected to each scanner circuit 30a-30d for providing DTMF signals via a seized outgoing trunk to the AIS. The DTMF/MF circuit 35, called the "MF sender", has a jack for connecting to a conventional DTMF telephone 36 which is employed for programming the system. At the time the T, R, and sleeve lead for a particular changed number are connected to the AIS interface 10, information corresponding to this changed number must be entered into the system. The DTMF telephone 36 is basically used as an input terminal for programming.

All operator commands to the AIS interface 10 are input in the form of DTMF digits from the local DTMF telephone 36 connected to the LINE ACCESS telephone jack. This jack is provided on he DTMF/MF circuit 35. The AIS interface provides two response tones called ACK and NAK, to indicate a successful receipt of input or an error situation, respectively, ACK tone is a single burst of multifrequency "KP" tones, while NAK consists of short beeps of "KP" tones.

After the MF spill has been provided from the AIS interface 10 to the remotely located AIS, the AIS will most likely respond by providing the changed number intercept message appropriate for the particular originator-dialed number, for example, "The number you have called, XXX-XXXX, has been changed. The new number is YYY-YYYY. Please make a note of it." While the message is being played, the AIS office can return offhook back to the originating office, or not return offhook. These options are typically called "answer supervision", or "no answer supervision", respectively. The preferred AIS interface 10 is configured to accommodate both options.

Next will be discussed the DTMF/MF circuit 35, as shown in greater detail in FIG. 4. One basic function of the DTMF/MF circuit 35 is to program the system so that a particular telephone number is associated with a particular sleeve. A second basic function of the circuit is to outpulse the telephone number of the associated sleeve to the remote AIS announcement equipment when that telephone number is called by a calling party, so that a message appropriate for the particular telephone number may be delivered.

In accordance with the programming function, the T and R lines from the DTMF programming telephone 36 are connected at the LINE ACCESS jack, and thence to an antisidetone circuit 51 of a conventional nature. The output of the antisidetone circuit 51 is provided on line 52 through an RC coupling and filter network 53 to a DTMF decoder circuit 54, such as a type MT8860 DTMF decoder manufactured by Mitel Semiconductor, San Jose. Calif., or other equivalent circuit. Tone decoder circuit 54 provides a four-bit decoded output, together with a STROBE signal, on lines 56 to four input port lines A0-A3 and input strobe terminal ADST, respectively, of a peripheral input/output (PIO) circuit 60. PIO 60 is a conventional Z80 compatible peripheral circuit, and is connected via lines 41 to the data bus, address bus, and control lines of the microprocessor 40. The tone decoder circuit 54 decodes DTMF signals received from the DTMF telephone 36 for programming, and DTMF signals received from the scanners.

A tristate bus transceiver (XCVR) circuit 61 couples the eight data bus lines D0-D7 from the microprocessor 40 to the data bus lines D0-D7 of the PIO for bidirectional data transfer. The direction of data flow, whether input or output, is controlled by an address decoding and control circuit 63, which receives control lines from the microprocessor, and provides a direction signal DIR to the transceiver circuit 61. The address decoding and control circuit also provides a clock pulse signal CP, which is employed to latch data in from the microprocessor data bus as will be described below. The address decoding and control circuit 63 is conventional in nature and merely detects when the microcomputer is addressing the PIO 60 for a read or a write operation, or when the clock pulse CP is to be provided for a write operation to a latch circuit 67.

A latch circuit 67 is configured to receive the data bus lines D0-D7 from the microprocessor 40 and store data on these data bus lines at the time of the CP. Latch 67 is preferably a type LS374. The latch circuit 67 stores data which is to be converted to multifrequency tones, which is provided on outputs Q0-Q4 to four data-in (DI) lines and a chip-enable (CE) line of a multifrequency encoder 70. Output line Q7 of the latch 67 controls an analog switch 70, which selectively connects the signals on line 52 for output from the DTMF/MF circuit 35.

The MF encoder circuit 70 may be a type of MT8880 integrated DTMF transceiver, manufactured by Mitel. The tone output OUT of the MF encoder circuit 70 is amplified by a buffer amplifier/driver 73, which drives a resistor/capacitor R1/C1 series network connected to standard antisidetone transformer T1.

An analog switch 71 is provided between the antisidetone circuit 51 output on line 52 and the node 74 between R1 and C1 at the input to antisidetone transformer T1. The analog switch is used to block the MF outpulsing by the MF encoder 70 to the AIS from being seen at the input of tone decoder 54. When programming the sleeve leads and phone number assignments into the system, the MF sender is switched to appear on line 52 to provide the ACK and NAK tones to the programming operator.

Still referring to FIG. 4, four LED's CR1-CR4 are provided for status display; there is one LED for each of four possible scanners. When a call is being handled by a particular scanner circuit, its associated LED will be illuminated by the microprocessor. The anodes of the diodes are pulled up to five volts through current limiting resistors, while the cathodes are connected to the outputs 1Y1-1Y3 of a tristate buffer circuit 75, a type LS241. Four inputs 1A0-1A3 of the buffer circuit 75 are connected to receive four output signals B4-B7 of an output port of PIO 60, so that the LED's can be selectively illuminated under program control.

Four other inputs 2A0-2A3 of the buffer circuit 75 are connected to receiver four ring detect signals RDET0-RDET3, one from each of the four scanner circuits 30a-30d. The corresponding output lines 2Y1-2Y3 of the buffer circuit 75 are connected to port lines B0-B3 of the PIO 60, so that the ring detect can be employed to trigger an interrupt of the microprocessor. This provides in the preferred embodiment the ability to provide precise, interrupt-driven ring trip timing as required by some central office switching equipment for charge/no charge supervision.

Referring next to FIG. 5, each one of the scanner circuits 30a-30d has ability to scan or monitor call activity on up to thirty-two telephone numbers which may be connected by the EM switching equipment. FIG. 5 is a block diagram of a typical scanner circuit 30, of which there are four in the preferred embodiment. Signals denominated S0-S31 are provided to trunk scanner circuits 80. Details of the trunk scanner circuit are found in FIG. 6. The signals S0-S31 originate in the EM central office, and correspond to the sleeve leads of the changed or disconnected subscriber telephone numbers connected for operation with the present invention. Outputs of the trunk scanner circuits are sleeve ground signals denominated SGD0-SGD31.

The sleeve ground signals SGD0-SGD31 are provided to a computer interface circuit 81, which conditions the signals for provision to the microcomputer 40. The computer interface circuit 81 also controls the actuation of relay coils 83 and control signals to the audio path circuit 84. Details of the relay coils 83 are found in FIG. 10, while the audio path circuitry 84 is described in connection with FIG. 8. The audio path circuit receives the parallel T and R connections of an incoming intercepted call on an incoming trunk (ICT) from the EM central office switching equipment, and connects the incoming call to an outgoing trunk (OGT) to the AIS. The intercept message from the AIS is connected to the incoming call via the audio path circuitry.

The audio path circuitry 84 also provides the ring detect signal RDET from the scanner circuit to the DTMF/MF circuit 35. The MF spill from the DTMF/MF circuitry 35 is connected to the audio path circuit 84.

LED status indicators are provided for each scanner 30 to monitor call progress: recognition of a request for service (SR); incoming loop seizure (SZ); outgoing trunk connection detection (OGT); and major alarm condition (ALM). The major alarm will result from loss of power, permanent sleeve ground, or under processor control from consecutive failed attempts to receive a wink. These LED's are associated with each scanner circuit, but since construction of such LED indicators is within the skill of the art further details are not needed. Alarm outputs are available for connection to central office alarm facilities.

Referring to FIG. 6, next will be discussed the trunk scanner circuits 80, of which there are thirty-two in each scanner circuit 30. When a sleeve lead such as S0 is idle, it will provide resistive battery ($-48$ V) to the EM switching equipment. When a service request is received, i.e., an incoming call to an intercepted number is received by the EM central office, a ground will appear on the sleeve lead S0; current will flow through a 1200$\Omega$ idle test resistor R8 and complete a circuit through an optoisolator circuit 86. The corresponding sleeve ground signal, such as SGD0, will then appear at the computer interface circuit 81. The microcomputer is continuously scanning the SGD terminals, and when a service request is indicated, one of the first responses is the actuation of a service request (SR) relay. This causes the closing of normally-open (X) relay contacts K-SR shown in FIG. 6, placing $-35$ V from line 87.

The closing of the SR relay contacts causes the following actions to take place. In the scanner circuits of sleeves not being served, diode CR5, connected through current-limiting resistor R10 and the gate of an SCR 88, will now become forward-biased, causing the SCR 88 will conduct. However, the particular SCR on the sleeve being served is biased off due to incoming ground on sleeve lead. Since the SCR's for all other trunk scanner circuits 80 will conduct ground to the corresponding sleeve leads, the central office equipment will "see" all these sleeves as busy.

In further response to a service request, a ringing condition is expected on the incoming trunk. When this is detected by the microprocessor, the sleeve ground relay (SLVG) is closed, and the normally-open contacts K-SLVG will connect ground to the SLVG line, which is connected in parallel to each of the other trunk scanner circuits shown in FIG. 6. The effect of this is to make all trunk scanner circuits busy while a service request is being handled. Additionally, SLVG provides a "locking" ground to the calling sleeve.

When the central office is in the process of placing a call to one of the lines in the group of thirty-two, it first tests the sleeve lead to the selected line to determine its busy-idle status. If idle, it then proceeds to set the connection from calling subscriber to the selected line. The connection is established when the central office equipment grounds (or near ground) the selected sleeve lead.

The sleeve lead ground will turn on optoisolator 86, which identifies the line selected to the processor by a low on its SGD-lead. The response from the processor is the operation of the SR, service request relay. Relay SR operating lights an SR LED (not shown), and applies $-36$ volts toward the SCR 88 gates. This trigger voltage level turns on all SCR's associated with sleeve leads that are at the $-48$ volt level (idle), which is all sleeve lead circuits except the one initially selected.

Each SCR in the ON state connects ground via the normally closed contacts K-SLVG to its associated sleeve lead and results in that sleeve lead now set to the busy condition, preventing the central office equipment from selection of any other lines in the group. The diode CR8 (of which there are thirty-two) connected to each sleeve via $-48$ V are used for protecting the sleeve lead from overvoltage to turn SCR on during transient period.

Operation of relay SLVG is controlled by the processor. Its actuation connects ground through its normally-open contacts K-SLVG and diode CR6 to the sleeve lead. Typically, the scanner circuits 30 will appear to the central office as line circuits, with sleeve lead holding ground provided by central office circuits (trunk or connector). For this case, relay SLVG is operated at the end of the service request immediately following a test that the identified sleeve lead has returned to its idle state (customer hang-up). SLVG operation makes all lines look busy, and removes the holding current from all the SCR's 88 that were on, releasing them. SLVG is then released and the circuit is available again.

In absence of a service request, $-48$ V is connected through resistors R9, R10 to the anode of diode CR5. This effectively reverse-biases the diode, and the SCR 88 will not conduct. Thus, if the scanner circuit 30 is not in the process of serving a request, the SR and SLVG relays will be unoperated, and each sleeve lead S0–S31 from the central office terminated through its resistor R8 and optoisolator 86 to $-48$ volts, which constitutes the idle sleeve lead condition.

It will also be noted in connection with FIG. 6 that an alarm relay contact K-ALM is connected through a diode CR6 to the sleeve input line. The coil of the alarm relay is continuously pulsed by the microprocessor and the contacts are held closed; this is the "normal" configuration. In an alarm situation, such as power loss, these normally-open contacts will close, connecting ground to the sleeve leads and making all circuits busy.

Figure 7:
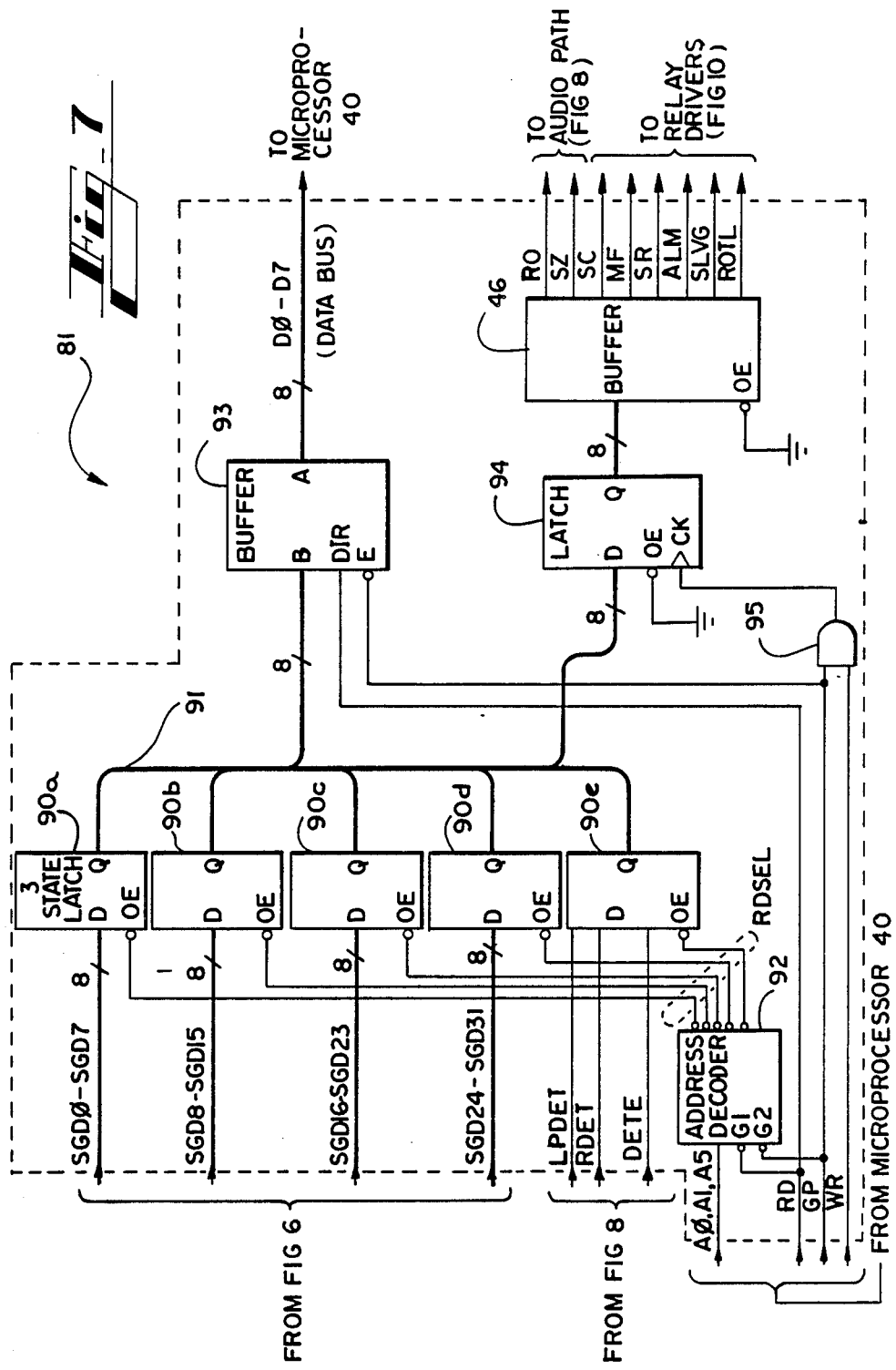
FIG. 7 is a detailed schematic diagram of a computer interface circuit utilized in the scanner circuit shown in FIG. 5.

Turning next to FIG. 7, each of the isolated sleeve ground leads SGD0–SGD31 from the trunk scanner circuits 80 are provided to circuitry in a computer interface circuit 81. This circuit, under control of the processor, reads and writes data via an 8-bit data bus between the processor and the four scanner circuit boards. The processor scans various input data registers on each board to collect data; or selects an output latch and buffer driver on each board to transmit data.

The thirty-two sleeve detect leads SGD0-31, the ROTL loop detect lead LPDET, the outgoing trunk connection detect lead DETE, and the ring detect lead RDET, each present an active low going signal to an input data register 90a–90e.

Output data to the trunk consists of an alarm lead ALM (normally pulsed by operating system software to keep relay ALM operated) and other control leads as follows: reorder control enable RO, service request SR, subscriber cut-through SC, MF sender control MF, loop seizure SZ, and sleeve ground control SLVG, which are all active in the high state.

The sleeve ground leads are grouped in eight's and connected to the D inputs of the latch circuits 90a–90d, each being a type LS373 tristate latch. The outputs of the latches 90a–90d are connected to a common eight-bit bus 91, and the output of a particular latch is enabled to the bus by the output enable (OE) terminal. The OE terminals are connected to an octal address decoder circuit 92, which receives address lines A1, A2, and A5 from the microprocessor 40, as well as control signals from the microprocessor RD, WR, and GP (which corresponds to an input/output request IORQ of the Z80) for reading, writing, and input/output request. When a particular one of the latches 90 is enabled for reading by the microprocessor, its corresponding OE line will be low, enabling its output to the bus 91, while the remaining latches will remain in the high-impedance state. Data on the bus 91 is buffered onto the microprocessor data bus D0–D7 with buffer 93, a type LS245. Data may pass both ways through the buffer 93, which is bidirectional.

Input data register selection is accomplished by a binary address on leads A0, A1, and A5 to the octal decoder 92. This address is decoded into a low on one of the outputs RDSEL when the RD and GP leads from the processor are both low. The selected register data output will follow the data input and are presented to the buffer or transceiver 93, which has its direction control set for B to A by the same RD and GP low. The transceiver 93 thus presents the selected data to the processor on the D0–D7 data bus. If either GP or RD signals are high, the RDSEL decoder outputs will all be high. The GP signal high isolates the transceiver 93 from either communication direction.

With processor control lead GP at a low state and lead RD high, the communication direction for the transceiver 93 is set from A to B to present the processor data bus to the output latch 94 via the transceiver. A pulse on the WR processor lead will output a low-going pulse from the gate 95. The positive going trailing edge of the pulse will clock the input data to its output, latching the data and passing it to the buffer-driver 96 to activate or deactivate the trunk control relays.

The signals for actuating the relays are denominated reorder (RO), seize (SZ), alarm refresh (ALM), subscriber cut-through (SC), multifrequency attach (MF)(attaches the MF sender to the OGT), service request relay (SR), sleeve ground relay (SLVG), and ROTL. The seize (SZ) and reorder (RO) signals are provided to the audio path circuitry 84, while the remainder of the signals are provided to the relay drivers 83. These signals are written to latch 94 under control of the microprocessor by a write pulse (WR) and input/output request GP via AND-gate 95, and buffered via buffer 96, a type LS244 tristate octal buffer.

Other status type of formation is read by the microprocessor via latch 90e. A signal indicating detection of loop current (LPDET) is provided from the audio path circuit 84. Loop detect in (LPDETIN), ring detect (RDET), and detect E (DETE). It should be noted that ring detect is normally scanned via latch 90e, although, as discussed in connection with the DTMF/MF circuit 35, ring detect also triggers an interrupt for certain applications.

Figure 8:
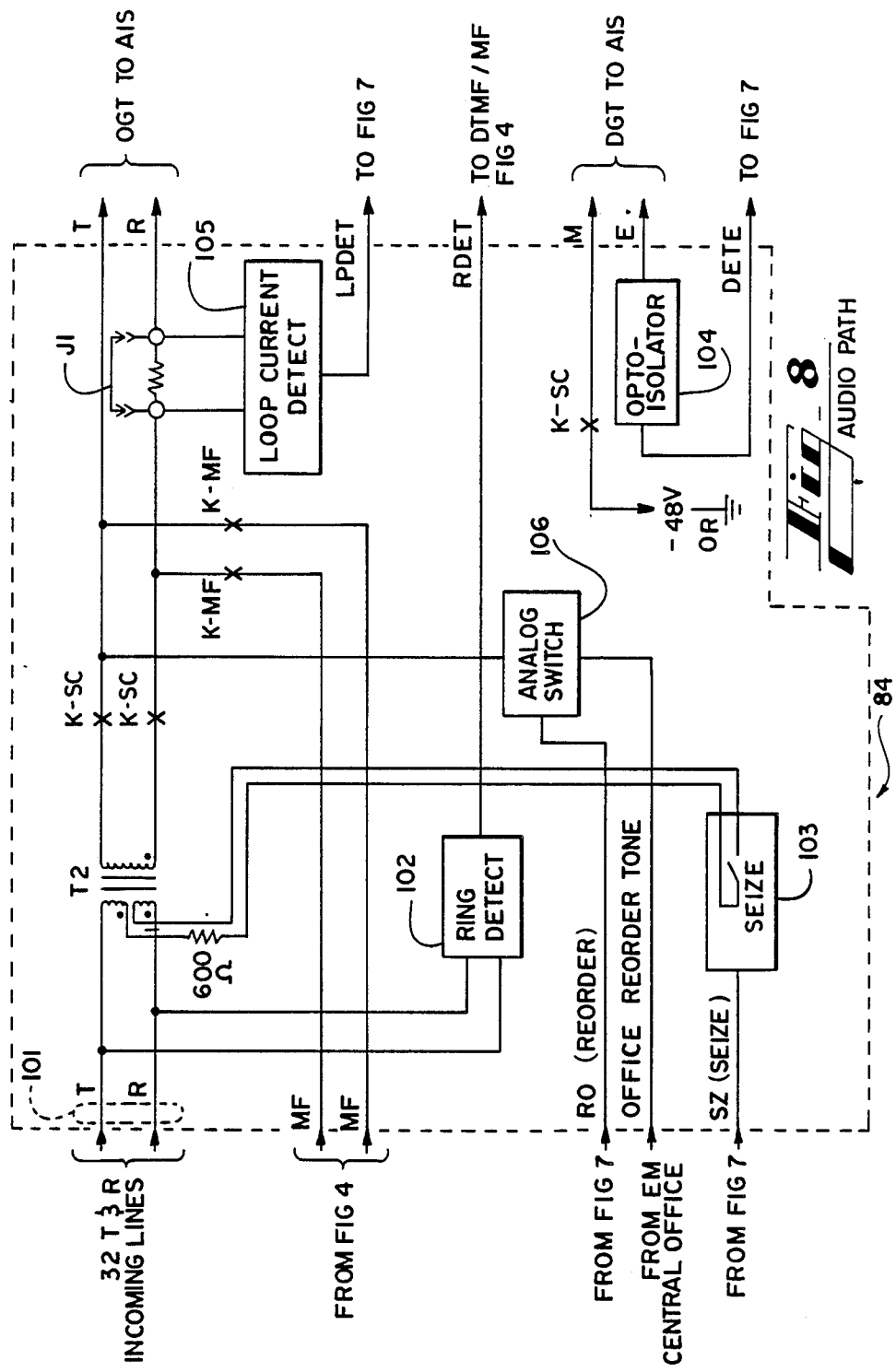
FIG. 8 is a detailed schematic diagram of a non-ROTL audio path circuit utilized in the scanner circuit shown in FIG. 5.

Turning to FIG. 8, the audio path circuitry 84 will be described next. The thirty-two T and R lines from the intercepted telephone number connections from the EM switching equipment are all connected in parallel to the T and R lines 101. The T and R lines are coupled to the T and R lines of the outgoing trunk OGT via a conventional antisidetone coupling transformer T2.

A conventional ring detect circuit 102 is connected across the T and R lines, and provides a ring detect signal RDET to the DTMF/MF circuit 35. As such ring detect circuitry will be known to those skilled in the art, such will not be described further herein. It will be appreciated that there is a separate audio path circuit 84 for each of the four scanners 30, so that if the ring detect signal will identified to associate it with a particular scanner, such as RDET1.

In response to a ringing condition, the microprocessor will assert the seize control signal SZ, which originates on the computer interface circuit 81, and thereby seize the trunk via a seize circuit 103. Seize circuit 103 is also conventional in nature. The seize circuit 103 connects a 600 Ω shunt resistor across T and R through the coil of T2. The seizure will be attempted forward by the outgoing trunk to the AIS, provided that the subscriber connect relay contacts K-SC remain closed. The seizure forward will be attempted on the M lead (for E and M signalling) by one of the K-SC relay contacts. This will provide either battery (−48) or ground on the M lead, depending on the type of E and M signalling employed. A wink signal is then expected back on the E lead. The E lead is connected to an optoisolator 104, which provides an E-detect signal DETE to the computer interface circuit 81.

Upon detection of the wink, the microprocessor will attach the DTMF/MF sender 35 by actuating the MF relay, closing the K-MF relay contacts. This will connect the MF signals onto the T and R lines of the outgoing trunk OGT. Once this connection has been made, the MF signals or spill corresponding to the digits of the telephone number associated with the triggering sleeve are transmitted over the OGT to the AIS. Upon receipt of the MF spill, the AIS will provide the appropriate intercept message.

Also in FIG. 8 is shown a conventional loop current detect circuit 105, connected to the R line of the OGT, for use when loop current signalling is employed rather than E and M. To configure for loop current signalling, jumper J1 will be disconnected, and the current in the loop will be detected. The loop detect signal LPDET is provided to the computer interface circuit for reading by the microprocessor.

The office reorder tone from the EM central office equipment is brought in to an analog switch 106. When appropriate, the microprocessor asserts the reorder control line RO which switches the reorder tone onto the T line. If the caller remains on the line after the intercept announcement, after a predetermined time period the microprocessor connects the reorder tone.

Referring next to FIG. 10, a plurality of relays are provided for connecting various circuit components for operation in connection with the preferred embodiment. Signals for turning on an alarm relay ALM, a subscriber connect relay SC, a multifrequency send relay MF, a service request relay SR, a sleeve ground relay SLVG, and a remote office test line relay ROTL are provided through optoisolators 110a–110f to conventional relay driver circuits 111a–111f, respectively, which drive the respective coils of the relays. Those skilled in the art will appreciate that the microprocessor can selectively actuate and deactuate the relays to cause the connection and disconnection of the relay contacts illustrated in the several figures and described herein.

Outputs from the buffer-driver 96 (FIG. 7) for the SC, MF, SLVG, ROTL and SR relays each control identical circuits. With an output in the low state, optoisolators 110 will be turned on, connecting −48 V to the darlington transistor relay drivers 111, resulting in a high impedance state on its output to the relay. When the buffer-driver output is high, the optoisolator will be off and the −36 volts to the driver will be off and the −36 volts to the driver will output −48 volts to operate the associated relay.

The alarm relay circuit requires a low going pulse every 25 mS. This low on the ALM lead turns on its associated optoisolator to connect −36 volts to the darlington transistor drivers 111, whose output will −48 volts to the ALM relay, keeping it operated. If the pulse should fail to be received, the −48 volts to the driver will result in a high impedance output, releasing the ALM relay. Also, if −48 volt power to the scanner board fails, the ALM relay will release.

The other buffer-driver output control leads are inactive in the low state. In a high state their function is as follows:

RO: reorder enable. As discussed earlier, this presents central office reorder tone through the contacts of relay SC to the transformer and thus to a connected line. The purpose of this feature is to persuade a calling party to disconnect particularly when the connection is under calling party control, the intercept message has been completed and the party is still connected.

SZ: seizure. This places a 600Ω DC shunt across tip and ring to trip ringing and/or provide answer supervision to the central office.

Turning next to FIG. 9, there will next be described an alternative configuration for allowing ROTL testing when the AIS intercept system is connected for operation with a CAROT system. Many of the functions described above in connection with FIG. 8 are the same as in FIG. 9 for operation with ROTL, with the exception of the items to be described next. Moreover, FIG. 9 illustrates an alternative connection methodology for connection of an intercepted call to the outgoing trunk associated with the scanner.

The first sleeve of each scanner is dedicated for operation with ROTL, for example sleeve 0 of scanner 0. The ROTL audio path is connected to lines TT and RR shown in FIG. 9; the ROTL equipment is connected to these lines. When a ground is sensed on the ROTL sleeve of a scanner, two ROTL relays ROTLA, ROTLB are actuated. A high impedance battery feed or "talk battery" must then be connected to the trunk. This is furnished in the preferred embodiment by ROTL circuit 113. In conventional circuitry, a modulated battery source from an inductive feed coil supplies current for a ROTL link. The ROTL circuit 113 comprises balanced noninductive high impedance (about 900Ω) current sources, so that the ROTL circuit is not loaded. A mere resistor connected to a power source would disturb the network transmission parameters and prevent an accurate transmission line measurement by the CAROT. Thus, a balanced ROTL circuit which minimizes loading but provides constant current is indicated.

ROTL circuit 113 may be characterized as a solid state inductor—it provides voltage at the battery level but minimizes any change in current. The circuit 113 comprises transistors Q1, Q2, with Q1 being NPN and Q2 being PNP. Transistor Q1 provides a battery side, being connected to −48 V, while Q2 provides a ground side. The base of Q1 is connected to ground via a 4.7kΩ resistor, and to the cathode of a 6.2 volt zener diode. The emitter of Q1 is connected through 270Ω resistor to −48 V, while the collector is connected through a 33Ω resistor, diode CR9, and a relay contact K-ROTLA to the ring side RR of the ROTL trunk. A second 6.2 volt zener is connected between −48 V and the collector, biased toward the collector. It will be appreciated that the constant current provided by the ROTL circuit is equal to 6.2 V (the breakdown voltage of the zeners) divided by 270Ω, which yields about 22.9 mA.

The transistor Q2 is connected similarly, except to ground instead of −48 V. The base is connected to −48 V via a 4.7kΩ resistor, and to ground through a 6.2 volt zener. The emitter is connected to ground through 270Ω. The collector is connected to ground via a 6.2 volt zener, and through a 33Ω resistor and relay contacts K-ROTLA to the tip line TT of the ROTL trunk. Upon receipt of a ROTL call, the subscriber connect relay SC will be closed, the ROTLA contacts will be closed, and the normally-closed ROTLB contacts will open, connecting TT to T1 and RR to R1. This completes a circuit between the outgoing trunk OGT and the incoming ROTL signals on TT and RR from the ROTL equipment. The opening of the contacts of relay ROTLB disconnect the subscriber lines on the input lines T and R from the circuit. The ROTL circuit 113 will be connected by normally-open relay contacts ROTLA to be across TT and RR, and will serve its constant-current sourcing function.

Ringing applied to the tip and ring leads from the central office will be detected by the ring detect circuit 102', to output a low on lead RDET to the scan circuit during detection, as in the case of the non-ROTL circuit.

Seizure of the line is accomplished by a high from the scanner circuit on lead SZ which turns the seizure circuit 102. This action places a 600Ω DC shunt across incoming tip and ring, and lights the SZ status LED (not shown).

The AC path is through the capacitor C10 and resistor R15, the DC path through the 600Ω shunt resistor and optoisolators (not shown) in the seize circuit 103'. When current flows in the DC path (any low resistor shunt between TT and RR by ROTL initiated to do remote line testing), the loop detect circuit 105' will output a low on lead LPDET to the scanner circuit 30 and the constant current source circuit 113 will supply 20 ma to ROTL. The Z5 and Z6 are for overvoltage protection to transistors Q1 and Q2. The ROTLA relay provides the wink to ROTL system, and ROTLB provides the incoming tip and ring isolation to TT and RR during the period of ROTL testing to meet the requirement of high echo return loss.

Signalling and Other Options

Control of line seizure following ringing detection is a function of the processor programming. One of two variations may be employed: for no-charge in which answer supervision is disabled; and for charge in which answer supervision is returned to the central office. These respectively operate as follows:

Following the recognition of the second ringing cycle, to assure audible ring back tone heard by the calling party, the processor seizes the line by asserting the SZ signal for 25 milliseconds. The connected 600Ω DC shunt resistor (FIGS. 8 and 9) will trip the ringing source from the central office. This removes the DC supervisory loop to the central office, resulting in the absence of answer supervision, and hence no charge.

Again as above, sufficient time must be allowed to ensure ring back tone to the calling party. Following the ring interval, the seizure is made and maintained throughout the call. This trips ringing, following which answer supervision is recognized by the central office.

The no-charge option leaves control of the connection under the calling party; and the SZ indication will be momentary. The charge option allows called party control, as the processor can monitor the LPDET signal throughout the call to detect early calling party disconnect, or at the end of the call to force calling party disconnect by removing the DC shunt. Calling party disconnect is also detected by sleeve abandonment, that is, the sleeve will return to the idle state, which is detected by scanning the sleeve leads.

These options are typically called "answer supervision", or "no answer supervision", respectively. The AIS interface 10 is capable of accommodating both options. A plurality of option switches (not illustrated) connected to a status register of the microprocessor 40 allow configuration of the AIS interface for either answer supervision or no answer supervision modes in the AIS. In answer supervision, the AIS interface 10 expects the AIS to go on hook after completion of the intercept message. In the event that the AIS is not configured to return answer supervision, the AIS interface 10 cannot determine when the intercept message has been completed. This is handled in the no answer supervision mode by activating a timer, which runs for about thirty (30) seconds after connection to the AIS. After seizure and wink, accordingly, a timer begins to run, and after expiration the connection to the AIS is automatically broken.

Another option provided in the preferred embodiment is the ability to provide answer supervision to the originating caller. This is also called "charge supervision", since it allows the calling party's billing equipment to terminate the billing period (if billing equipment is connected at the originating central office). Typically, intercepted calls are not billable events, for example if the calling party is called from a pay telephone the coins are typically returned, but the ability for charging is provided. Again, this is signalled to the originating caller by going off hook at message completion (when off hook is seen from the AIS) or at timer time-out. Provision of charge supervision mode is indicated by an option switch (not shown) connected to a status register of the microprocessor 40.

Many EM offices currently employ fixed intercept systems ("FIS") for call intercept, which provides a generic announcement to callers to a changed number, for example, "The number you have called has been changed. Please dial four-one-one for operator assistance for the new number." These FIS have not provided charge supervision. In the event that the caller who reaches such an FIS leaves his telephone off-hook for some reason, the trunk and associated circuitry in the terminating central office are held tied up, and cannot service other changed numbers. A disconnect timer is typically employed to solve this problem. It typically automatically disconnects a trunk after the expiration of a predetermined time. A disconnect timer also is activated when a called party hangs up. These timers typically run about 12–30 seconds, an amount of time usually not quite enough to complete a changed number intercept message.

In order to prevent any disconnect timers connected to the equipment from prematurely disconnecting an intercept message, the signal SB (FIG. 3) is employed as a "disconnect timer defeat" lead. This signal is provided to the central office disconnect timers to disable their operation. This automatically comes up every time an intercept message is handled. The SB signal, a "signal battery" signal, is also employed in applications not involving ROTL where four-wire E & M signaling is used.

In order to simplify the signalling and supervisory requirements of the distant AIS, in the embodiment configured for ROTL (FIG. 9) provision is made for 2-wire operation of standard type I of E & M lead signalling only. Because E & M supervision is employed, the M lead signals the distant AIS upon operation of the MF relay. Seizure by the AIS returns a signal on the E lead, activating the DETE signal. Accordingly, although the E and M signals and circuitry shown in FIG. 8 are not shown in FIG. 9, it will be appreciated that such circuitry may be employed in a ROTL-compatible embodiment.

Types of E & M supervision vary according to line balancing requirements, and whether the signal battery and ground sources originate form the local end or the distant end. Generally these types are as follows:

Type I: Unbalanced 2-wire path, typical of electromechanical systems. Local −48 volts are provided on the M lead and distant ground is received on the E lead. In some Bell System applications, for example Southwestern Bell, the type I would be used.

Type II: Balanced, using distant −48 volts on the M lead, and local ground returned on the E lead.

Type III: Balanced with distant −48 volts from SB lead (off-hook) or distant ground on SG lead (on-hook) output on M lead, and distant ground returned on the E lead.

Type IV: Balanced, with distant ground on SB lead output on M lead, and local ground to SG lead returned on the E lead.

Type V: Unbalanced (and generally unused) with local ground output on the M lead, and distant ground returned on the E lead.

Supervisory operation requires the seizure (M lead) throughout the connection to the AIS. When the AIS is attached and ready for pulsing, it returns a 200 mS wink signal on the E lead. This is notification for the microprocessor to cause MF sender output. When all expected digits are received by the AIS, and the message output is ready, the E lead is returned as answer supervision throughout the intercept message. Removal of the E lead signal is disconnect supervision.

Upon recognition of answer supervision by the microprocessor, the SC relay is operated and the MF relay released. This connects the calling party to the outgoing trunk for message reception, and disconnects the MF sender, allowing its use on calls in other groups.

Another capability provided in preferred embodiment is the ability to make the AIS interface 10 busy to all its subscriber telephones remotely from a distant trunk end. In the event that a problem exists at the terminating or AIS end of the outgoing trunk, it would be desirable to prevent access to the AIS over the faulty trunk. The AIS interface, if it does not know that the trunk it is accessing is faulty, would otherwise continue to attempt calls over the bad trunk. By making the outgoing trunk busy, the particular scanner associated with that trunk can be made busy, and callers to intercepted numbers will receive a busy signal rather than an intercept message, until the problem with the bad trunk can be corrected.

This is accomplished by the sending of an off-hook signal (either ground or battery, depending on system configuration) on the E lead, which makes all sleeves in the preferred embodiment busy. The microcomputer is operative to continuously scan the E lead with the circuitry shown in FIG. 8. If the E-detect signal DETE remains at ground (or battery, as the case may be) for a predetermined time, and an intercepted call is not being processed by the AIS interface, the microprocessor is operative to actuate the sleeve ground relay SLVG, which connects ground to all the sleeves in the scanner and makes them busy. This scanning of the DETE for this operation, which may be termed "remote make busy", is performed during the idle state of the software, that is, during those times that an intercept call is not being processed.

The difference between this function and normal operation is that, in normal operation, the AIS interface 10 initiates a call over the OGT by seizing the M lead; a wink back is expected over the E lead. If the E lead goes to off-hook without the initial sending of the M signal, it is an indication of a problem with the trunk from the far end, and all sleeves are made busy in response thereto. A caller to an intercepted number will then hear a busy signal. When the problem is corrected, the off-hook on the E lead is removed.

Software Description

Figure 11:
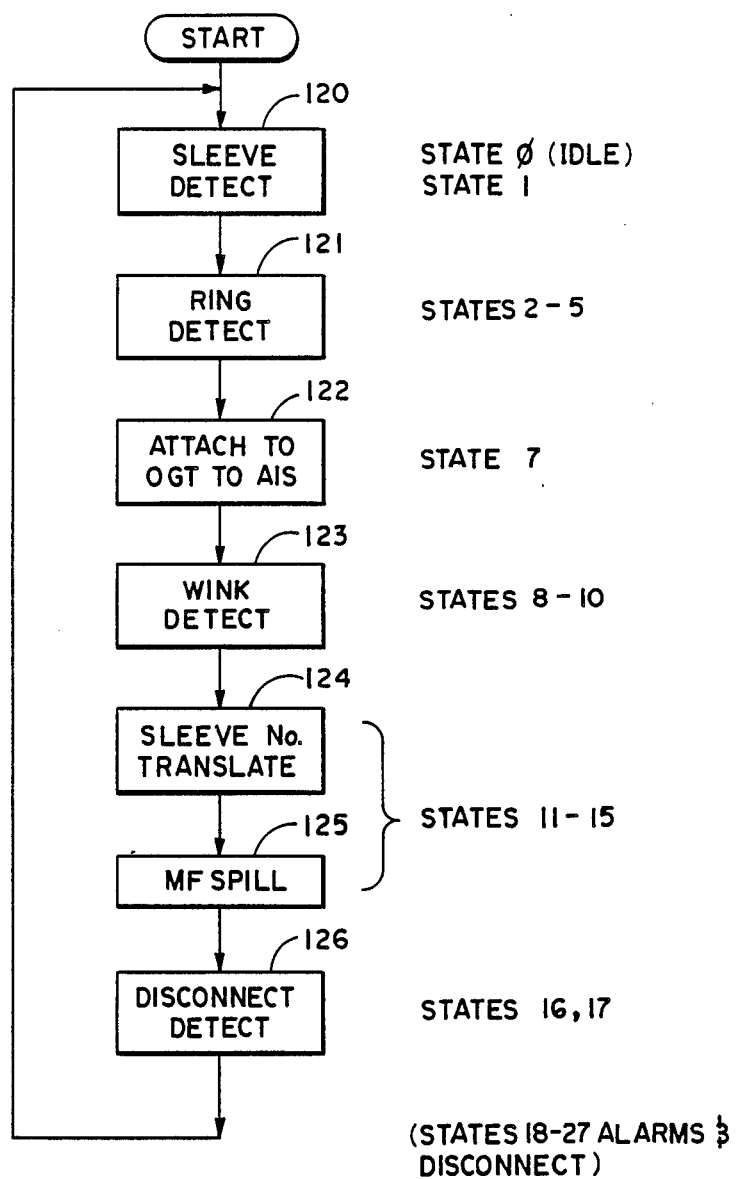
FIG. 11 is a flow chart diagram illustrating the program executed by the microprocessor employed in the preferred embodiment.

Turning now to FIG. 11, the general program flow of the program for microprocessor 40 is illustrated. The general operation of the program is as follows. Sleeve leads are scanned for ground. Sleeve leads correlate to a pre-assigned telephone number. When a sleeve is grounded, the OGT is attached to the tip and ring, a DC shunt is applied and ringing is tripped. The MF sender is then attached and outpulses the desired number through the OGT to the outgoing tip and ring. Local programming, i.e., association of sleeve leads and telephone numbers, is done through the DTMF type phone set 36. The preferred microprocessor circuitry provides RAM storage of up to 128, ten digit telephone numbers.

The program for the microprocessor in the preferred embodiment is written as a series of relatively independent modules, which take the form of states in a state machine. Thus, although blocks are shown in FIG. 11, it should be understood that each block has associated therewith a particular state which is responsive only to certain inputs, and provides only certain outputs. The associated states are listed to the side of the block, and will be described in greater detail below. Each pass through the program shown in FIG. 11 is made once every 25 mS for each one of four scanners, and the appropriate state for the set of inputs looked at is entered. If there is a separate OGT for each scanner 30, then the program is configured to execute each of the blocks for each of the scanners during each "pass" through the steps in FIG. 11.

The program begins a particular scan at block 120 of FIG. 11. The sleeves are scanned in groups of thirty-two for a ground, i.e., a call to an intercepted number associated with that sleeve. When a sleeve ground is detected, the system responds with a subscriber connect by actuating the subscriber connect SC relay and service request SR relay. In addition, all sleeves in the scanner other than the originating call are grounded, to make them busy. States 0 and 1 are associated with this block.

At block 121, which typically is reached on the next scan, the system checks to see if the connection is still made, and is conditioned to be responsive to a ringing condition. If the central office has removed ground from the sleeve, then it is assumed that the sleeve detect was a glitch or transient, and no further response to the apparent call is made. If the sleeve is still grounded, the RDET signal is expected since ringing is expected. A state is entered for detecting ringing. The system will look for RDET for one complete ringing cycle and at least part of a second ringing cycle. At the beginning of the second ringing cycle, the seize signal SZ is applied, and the line is seized. This trips the ringing, and the system waits for ringing to complete. Depending on system configuration, answer supervision to no answer supervision will be applied. States 2-5 are associated with these actions.

At the next block 122, the system checks for the availability of the MF circuit 35. This is necessary because in the disclosed embodiment there is only one of such circuits for serving four scanners, and the circuit may be busy serving another scanner. If the MF sender is free, then the outgoing trunk OGT is attached, to connect to the AIS. Waiting for the wink back from the AIS is next. These actions are associated with state 7.

At the wink detect block 123, the system expects the wink signal back from the AIS. The wink cycle will be examined for proper characteristics, in states 8-10.

At blocks 124 and 125, the sleeve number which triggered the action is translated into a telephone number (via a lookup table in memory), and transmitted or outpulsed via an MF spill to the AIS. These actions are states 11-15.

When the MF spill is complete, block 126 is entered, and a wait state for the playback of the intercept message is entered. States 16 and 17 are associated with this action. If in answer supervision mode, a disconnect is expected; if in no answer supervision mode, the waiting is for a time-out of an internal microprocessor timer of a time sufficient for the message to complete (typically about thirty seconds). The program then returns to block 120 for the next cycle.

Description of Software Modules

The preferred software system for the AIS interface 10 comprises a conventional operating system and two subsystems: a Trunk Manager and a Command Manager.

The Trunk Manager module, trunk.c, which is written in the C programming language, provides the monitoring and control functions for the scanners 30. It consists of two parts: initialization and an infinite run time loop. The initialization portion gets control on system reset. The configuration DIP switch settings are read and the scanner trunks and trunk tables are initialized accordingly. The switch settings indicate which trunks are installed and to which trunk group they should be associated with. The trunk table is set up with the group assignments, the trunk state is set to IDLE and the process state is set to STATE0. The signals ALM, RD, SC, MF, SR, and SZ are negated for each trunk in the active groups. The SLVG signal is asserted and negated to clear the sleeves of all trunks. The signal ROTL is asserted and ALM is toggled. The main program loop is entered and the task is suspended. Subsequent activation is from an interrupt timer at a rate of 160 per sec.

The run time loop is a state machine which calls the appropriate state function for the trunks current states. The states in the preferred embodiment are STATE0 through STATE27. Only one state for a trunk is processed per activation (a trunk is serviced at 25 mS intervals. The state is passed the trunk table address. Each state returns the state number to be processed next. The next state is stored in the trunk table. The alarm status of the trunk group is checked and the alarms are refreshed if the group is not in alarm. The routine then loops and suspends.

Next will be provided a description of the various states of the program, and their corresponding inputs and outputs. In the description which follows, CYCLE1 and CYCLE2 are basic timing increments in the system, which are timed by a counter/timer circuit (CTC)(not shown) associated with the microprocessor 40. The basic cycle in the preferred embodiment is 25 mS; this is basically the scan rate of the system. Every 25 mS, an interrupt is generated and each scanner circuit 30 is serviced once. The trunk task module trunk.c obtains control four times every 25 mS interval, and processes one state for one scanner circuit. Thus, each scanner gets to execute one state every 25 mS. The various states are as follows:

STATE0.c Search for Busy Line—State 0 checks LPDET of each trunk in the current group. If asserted, the busy sleeve number is set to 32, the trunk is busied by asserting SLVG, the trunk group LED is illuminate, MF is asserted, the group state is set to TEST, CYCLE1 is set for 12 seconds, and process state 8 is returned. If LPDET is negated, DETE is checked. If asserted, CYCLE1 is set for 3 minutes, the sleeves are busied and state 27 is returned. If DETE is negated, the sleeve leads are scanned. If an asserted sleeve is detected, the group state is set to BUSY, the group LED is asserted, CYCLE1 is set for 50 mS, and process state 1 is returned.

STATE1.c Double Check for Busy Line and Decode Line—State 1 decrements and checks CYCLE1. If it has not expired, state 1 is returned. When CYCLE1 has expired, the busy sleeve is checked. If it has negated, then state 0 is returned. If the sleeve is still asserted, the sleeve number is calculated and stored. If the ROTL option is selected and the busy sleeve is sleeve 0 of a trunk, then state 0 is returned. Then SR is asserted on all trunks in this group to busy the sleeves. The state is tested for ALARM. If not in ALARM, the state is set to BUSY and process state 2 is returned.

STATE2.c Initiate Ring Detect—State 2 negates SR. CYCLE1 is set to 15 seconds. The sleeve is checked and if negated CYCLE1 is set to 500 mS, a variable denominated ERROR is incremented and process state 20 is returned; otherwise, process state 3 is returned. When the ERROR count reaches a predetermined number, typically two, an error condition is indicated and the alarm is activated.

STATE3.c Wait for First Ring—State 3 checks the sleeve and if negated, sets CYCLE1 to 500 mS and returns process state 20. If the sleeve is still asserted, RDET is read. If asserted, CYCLE1 is set to 6 seconds and process state 4 is returned. If RDET is negated, CYCLE1 is decremented and tested. If it has not expired, state 3 is returned. If it has expired, CYCLE1 is set for 500 mS, ERROR is incremented and process state 20 is returned.

STATE4.c State for End of First Ring—State 4 checks the sleeve. If it has negated, CYCLE1 is set for 500 mS and process state 20 is returned. If still asserted, RDET is read. If RDET has negated, CYCLE1 is set for 10 seconds and process state 5 is returned. If RDET is still asserted, CYCLE1 is decremented and tested. If it has not expired, process state 4 is returned. If CYCLE1 has expired, CYCLE1 is set for 500 mS, ERROR is incremented, and process state 20 is returned.

STATE5.c Wait for Second Ring Detect—State 5 checks the busy sleeve and if negated, sets CYCLE1 to 500 ms and returns process state 20. If the sleeve is still asserted, RDET is read. If RDET is asserted, CYCLE2 is set to 25 mS, CYCLE1 is set to 20 seconds, SZ is asserted, and process state 7 is returned. If RDET is still negated, CYCLE1 is decremented. If it has not expired, process state 5 is returned. If CYCLE1 has expired, it is set to 500 mS, ERROR is incremented, and process state 20 is returned.

STATE6.c State 6 has no function in this version of the software system. It is listed for completeness only.

STATE7.c Wait for MF Sender Available—State 7 checks CYCLE2. If it has not expired, CYCLE2 is decremented and process state 7 is returned. SZ is negated. The MF sender is tested for availability. If available, it is marked unavailable, CYCLE1 is set to 12 seconds, MF is asserted and process state 8 is returned. If the MF sender is unavailable, CYCLE1 is decremented and tested. If it has not expired, process state 7 is returned. If CYCLE1 has expired, it is set to 500 mS, ERROR is incremented and process state 20 is returned.

STATE8.c Wait for Start of Wink—State8 tests for the assertion of LPDET or DETE. If any one of these signals is asserted, the state is checked for TEST mode. If in test mode, ROTL is negated. In either case, CYCLE1 is set to 150 mS and process state 9 is returned. If neither LPDET or DETE is asserted, CYCLE1 is decremented and tested. If it has not expired, process state 8 is returned. If it has, process state 22 is returned.

STATE9.c Check Length of Wink Greater Than 150 mS.—State 9 checks LPDET and DETE. If they are all negated, process state 22 is returned. If not, CYCLE1 is decremented and tested. If CYCLE1 has not expired, process state 9 is returned. If it has, CYCLE1 is set to 5 seconds and process state 10 is returned.

STATE10.c Check Length of Wink Less Than 5 Seconds—State 10 checks LPDET and DETE. If they are all negated, the state is checked for TEST mode. It if is in test mode, ROTL is asserted. In either case, CYCLE1 is set to 75 mS. The state is checked for ALARM mode and if set, the state is changed to BUSY. Process state 11 is then returned. If LPDET and DETE are not all negated, CYCLE1 is decremented and tested. If CYCLE1 has not expired, process state 10 is returned. If it has, process state 22 is returned.

STATE11.c Setup to Outpulse KP and Do DB Lookup—State 11 decrements and test CYCLE1. If it has not expired, process state 11 is returned. If it has expired, the address of the MF digit stream is obtained by calling the fmtadr.c function, described below. CYCLE1 is set to 100 mS. The first digit of the MF stream is tested and if it is the stream terminator, process state 15 is returned. If not, the KP digit is output to the MF sender. Internal flags denominated TO_AIS and MF_ON are asserted and process state 12 is returned.

STATE12.c Wait for End of KP—State 12 decrements and tests CYCLE1. If CYCLE1 has not expired, process state 12 is returned. If it has, flag $MF_{13}$ OFF is asserted, CYCLE1 is set to 75 mS and process state 13 is returned.

STATE13.c Wait for End of Pause—State 13 decrements and tests CYCLE1. If CYCLE1 has not expired, process state 13 is returned. If it has, CYCLE1 is set to 75 mS. The next MF digit is read and if it is not the MF digit stream terminator, it is output to the MF sender. The flags TO_AIS and MF_ON are asserted, the MF digit pointer is incremented and process state 14 is returned. If the digit is the terminator, ST is output to the MF sender, TO_AIS and MF_ON are asserted and process state 15 is returned.

STATE14.c Wait for End of Digit—State 14 decrements and tests CYCLE1. If CYCLE1 has not expired, process state 14 is returned. If it has, MF_OFF is asserted, CYCLE1 is set to 75 mS and process state 13 is returned.

STATE15.c Wait for End of ST—State 15 decrements and tests CYCLE1. If CYCLE1 has not expired, process state 15 is returned. If it has, MF_OFF is asserted and the MF sender is marked available. LPDET and DETE are tested and if any one is asserted, SC is asserted, MF is negated, CYCLE1 is set to 120 seconds and CYCLE2 is set to 5 seconds. The trunk state is tested and if in TEST mode, CYCLE2 is set to 3 minutes and ROTL is negated. Process state 17 is then returned. If neither LPDET nor DETE are asserted, CYCLE1 is set to 6 seconds and process state 16 is returned.

STATE16.c Wait for Answer Supervision—State 16 sets CYCLE2 to 5 seconds. LPDET and DETE are tested. If any one is asserted, SC is asserted and MF is negated. The trunk state is tested and if in TEST mode, ROTL is negated and CYCLE2 is set to 3 minutes. CYCLE1 is set to 120 seconds and process state 17 is returned. If no answer supervision is the selected configuration, SC is asserted and MF is negated. CYCLE1 is set to 30 seconds. If the trunk state is set to TEST, CYCLE2 is set to 3 minutes. Process state 17 is then returned. If answer supervision is selected, CYCLE1 is decremented and tested. If CYCLE1 has not expired, process state 16 is returned. If it has, process state 22 is returned.

STATE17.c Wait for Disconnect Supervision—State 17 checks the trunk state for TEST mode. If in the TEST mode, LPDET is read and if negated, CYCLE1 is set to 500 mS, SC is negated and process state 20 is returned. If not in TEST mode or LPDET is asserted, CYCLE2 is decremented and tested. If CYCLE2 has expired, SLVG is negated, CYCLE2 is set ot 75 mS and state 18 is returned. If CYCLE2 has not expired, the configuration switches are read. If no answer supervision is selected, CYCLE1 is decremented and tested. If CYCLE1 has not expired, process state 17 is returned. If it has expired, SC is negated, CYCLE1 is set to 500 mS and the trunk state is tested. If in TEST mode, CYCLE1 is set to 15 seconds and process state 19 is returned. If on calling party control process state 24 is returned. If on called party control, process state 20 is returned. If on answer supervision, LPDET and DETE are read. If all are negated, SC is negated. CYCLE1 is set to 500 mS and the trunk state is checked for TEST mode. If in TEST mode, ROTL is asserted, CYCLE1 is set to 15 seconds and process state 19 is returned. If not in TEST mode, the configuration switches are read. If on calling party control, process state 24 is returned. If on called party control, process state 20 is returned. If LPDET and DETE are not all negated, CYCLE1 is decremented and tested. If CYCLE1 has not exired, process state 17 is returned. If it has, process state 22 is returned.

STATE18.c Check for Subscriber Disconnect During Announcement—State 18 decrements and tests CYCLE2. If CYCLE2 has not expired, process state 18 is returned. If it has, the sleeve leads are read. If all are negated, SZ and SC are negated. CYCLE1 is set to 500 mS, and process state 20 is returned. If the sleeve is still asserted, SLVG is asserted, CYCLE2 is set to 5 seconds and process state 17 is returned.

STATE19.c Wait for Intercept Disconnect in ROTL Test Mode—State 19 reads and tests LPDET. If negated, CYCLE1 is set to 500 mS and process state 20 is returned. If asserted, CYCLE1 is decremented and tested. If CYCLE1 has not expired, process state 19 is returned. If it has expired, trunk state is set to ALARM, CYCLE1 is set to 5 seconds and process state 19 is returned.

STATE20.c Called Party Control Disconnect Supervision—State 20 decrements and tests CYCLE1. If CYCLE1 has not expired, process state 20 is returned. If is has expired, SZ is negated and SLVG is asserted. CYCLE1 is set to 75 mS and process state 21 is returned.

STATE21.c Reset Group and Return to State 0—State 21 decrements and tests CYCLE1. If CYCLE1 has not expired, process state 21 is returned. If it has expired, ERROR is checked. If ERROR has exceeded 2, then the trunk state is set to ALARM, ERROR is set to 0, CYCLE1 is set to 5 seconds and process state 21 is returned. If ERROR has not exceeded 2, then ROTL is asserted, SLVG is negated and state 0 is returned.

STATE22.c Reset Control—State 22 negates MF, SC, and SR. The MF sender is marked available and ERROR is incremented and tested. If ERROR exceeds 2, the trunk state is set to ALARM and ERROR is set to 0. CYCLE1 is set to 1 second and process state 23 is returned..

STATE23.c Wait for Re-try—State 23 decrements and tests CYCLE1. If CYCLE1 has not expired, process state 23 is returned. If it has expired, CYCLE1 is set to 2 seconds and process state 7 is returned.

STATE24.c Wait for Subscriber Disconnect (Calling Party Control)—State 24 decrements and tests CYCLE1. If CYCLE1 has not expired, process state 24 is returned. If it has expired, CYCLE1 is set to a value obtained by reading the DIP configuration switches. This allows a variably selectable timeout for subscriber disconnect. CYCLE2 is set to 75 mS. SLVG is negated and RD is asserted. Process state 25 is returned.

STATE25.c Wait for Subscriber Disconnect After Reorder Tone—State 25 decrements and tests CYCLE2. If CYCLE2 has not expired, CYCLE1 is decremented and tested. If CYCLE1 has expired, CYCLE1 is set to 3 minutes and the trunk state is set to ALARM. If CYCLE1 has not expired, process state 25 is returned. If CYCLE2 has expired, SLVG is negated, CYCLE2 is set to 75 mS and process state 26 is returned.

STATE26.c Check for Subscriber Disconnect—State 26 decrements and tests CYCLE2. If CYCLE2 has not expired, process state 26 is returned. If it has expired, the sleeve is read and tested. If negated, RD is negated, CYCLE1 is set to 500 mS and process state 20 is returned. If the sleeve is still asserted, SLVG is asserted, CYCLE2 is set to 2 seconds and process state 25 is returned.

STATE27.c Wait for OGT to Unbusy—State 27 checks DETE and if negated, sets the group state to IDLE, negates SLVG and returns to state 0. If DETE is still asserted, CYCLE1 is decremented and tested. If CYCLE1 has not expired, process state 27 is returned. If it has, the group state is set to ALARM, CYCLE1 to 3 minutes, process state 27 is returned.

The functions of the Command Manager software are described as follows:

cmdmgr.c The command task function provides the command processing function for the programming and maintenance of the sleeve number assignments. The initialization portion clears the DTMF input buffer, clears the sleeve assignment file, releases the MF sender. The main program loop gets control from the interrupt driver by message passing. The appropriate command function is called for the current request.

addpno.c This function processes an add phone number request.

delpno.c This function processes a delete sleeve assignment by phone number request.

delsno.c This function processes a delete sleeve assignment by sleeve number request.

versno.c This function processes a verify sleeve assignment request.

ackout.c This function provides ACK tone output.

nakout.c This function provides NAK tone output.

fmtadr.c This function formats the effective address of a given sleeve lead.

fmtgrp.c This function formats the busy group number from the sleeve lead number.

tohex.c This function converts decimal ASCII to hexidecimal.

Other modules included in the preferred software system provide housekeeping and other miscellaneous functions. These types of functions will be known to those skilled in the art:

init.c This is an initialization function for providing hardware initalization. The task calls the initialization functions and then unlinks itself from the task queue.

initdev.a This initializes the CTC on the microprocessor card and the PIO on the DTMF/MF circuit card.

intvec.a This is a CTC and PIO interrupt vector table.

pioint.a This routine, a PIO interrupt service routine, handles interrupts from the DTMF/MF circuit. It is activated for inputting data via the programming telephone. The routine handles two types of requests. The first is command entry. In this mode, any entry will cause activation of the command task after reading the input data. The second mode will read several digits and store them into an input buffer. When the end of the buffer is reached or a '#' digit is received, the digits stored in the buffer are sent to the command task by activation of the device manager which in turn sends them to the command task via message passing.

inttmr.a This routine handles interrupts generated by the system clock (CTC channel 3). The system clock ticks 160 times per second. The trunk task is activated on each tick (6.25 ms). The timer task is activated once every 16 (100 mS) ticks.

devmgr.c The device manager is activated by the pioint.a interrupt handler to send the received digits to the command task.

Local Programming

All operator commands to the AIS interface 10 are input in the form of DTMF digits from a local telephone inserted into the LINE ACCESS headset jack. The system uses two kinds of tones, ACK and NAK tones, to indicate a successful response and error situation, respectively. ACK tone is a single burst of KP tone. NAK tone consists of 3 KP tones.

To program a telephone number into the AIS interface 10, or assign a phone number to a particular sleeve, an operator must first enter the digit "1". After the ACK tone is heard, the operator keys in the phone number followed by a "#" digit. A second ACK tone will be heard, after which the operator enters the sleeve a number 0 to 127, followed by a "#".

It is also possible to assign the same phone number to all sleeves, for example, when it is desired to provide a common or generic message to all changed numbers, or for testing. This will typically be done on initial set up or installation, for operational testing purposes. Since on installation the data base of changed numbers will not have yet been created, it is convenient to assign the same phone number to all sleeves so that the operation of the system can be tested. This is accomplished by entering the "#" twice after entering the phone number.

To delete or remove a phone number, a digit "2" must be entered. After the ACK tone, the operator enters the phone number followed by a "#" digit. To remove a phone number by sleeve lead, the digit "3" is entered. After ACK, the sleeve lead number is entered, followed by "#".

To verify the correctness of a programmed phone number and its corresponding sleeve assignment, the digit "4" is entered. After the ACK tone is heard, the operator enters the phone number followed by "#". After the second ACK tone, the sleeve lead number is entered, followed by "#". This is typically done to determine which sleeve lead is associated with a particular telephone number. Normally, the operator does not wish to change the preprogrammed telephone number and its sleeve lead association; he merely wishes to find out what sleeve lead is associated with the telephone number. If the sleeve lead number is not known, then it is necessary to enter an estimated sleeve lead number by trial and error; if the sleeve lead and telephone number are entered correctly, both ACK tones will be heard. If not, then the operator will hear the NAK instead of the ACK if an incorrect sleeve number is entered for that particular telephone number.

A more particular description, including an example, of the preferred local programming is as follows:

Program Phone Number

To enter a new phone number, the digit '1' must be entered. After the ACK tone, enter the phone number followed by a '+' digit. After the second ACK tone, enter the sleeve lead number followed by a '#' digit.

| Control Sequence | |
|---|---|
| Program 455-4949 for sleeve lead number 2: | |
| 1 | — |
| | — ACK Tone |
| 4554949# | — |
| | — ACK Tone |
| 2# | — |
| | — ACK Tone |
| Program 455-4949 for all sleeve leads: | |
| 1 | — |
| | — ACK Tone |
| 4554949# | — |
| | — ACK Tone |
| # | — |
| | — ACK Tone |

Delete by Phone Number

To remove a phone number, digit '2' must be entered. After the ACK tone, enter the sleeve lead number, followed by a '#' digit.

| Control Sequence: Delete 455-4949: | |
|---|---|
| 2 | — |
|  | — ACK Tone |
| 4554949# | — |
|  | — ACK Tone |

Delete Sleeve Lead Number

To remove a phone number by sleeve lead, the digit '3' must be entered. After the ACK tone, enter the sleeve lead number followed by a '#' digit.

| Control Sequence: | |
|---|---|
| Delete sleeve lead number 9: | |
| 3 | — |
|  | — ACK Tone |
| 9# | — |
|  | — ACK Tone |
| Delete all sleeve leads: | |
| 3 | — |
|  | — ACK Tone |
| # | — |
|  | — ACK Tone |

Verify Phone Number

To verify the correctness of a programmed phone number, the digit '4' must be entered. After the ACK tone, enter the phone number, followed by the '#' digit. Then, after the second ACK tone, enter the sleeve lead number, followed by the '#' digit.

| Control Sequence: | |
|---|---|
| Verify 455-4949 on sleeve lead number 9: | |
| 4 | — |
|  | — ACK Tone |
| 4554949# | — |
|  | — ACK Tone |
| 9# | — ACK Tone (Verified) |
|  | — NAK Tone (No Match) |
| Verify 455-4949 on all sleeve leads: | |
| 4 | — |
|  | — ACK Tone |
| 4554949# | — |
|  | — ACK Tone |
| 9# | — ACK Tone (Verified) |
|  | — NAK Tone (No Match) |

Alarm Processing

There are several alarm conditions to which the preferred AIS interface 10 is responsive. The presence of an alarm condition is indicated by a red alarm LED labelled ALM (not shown) on the front of each of the four scanner circuit 30 cards. Alarm outputs from each scanner 30 are connected to the alarm relay ALM, which will trigger (deactuate) in the event of an alarm. The following is a list of conditions which will cause this alarm mode to be entered:

1. Loss of power—If a fuse is blown or power is lost to any card in the system, an alarm will result. The ALM relay will drop out and connect ground to all sleeves.

2. MF Sender Failure—The AIS interface 10 will make three attempts to obtain a wink signal from the distant end. If three consecutive failures occur, an alarm will result. The system will continue to attempt every five seconds as long as the calling party holds the line, an when successful the alarm will retire.

3. Program integrity—If for any reason the program becomes "lost" or in an endless loop, the alarm will be activated.

4. False sleeve ground—If a sleeve becomes grounded but no ringing is applied, an alarm will result after one minute. If the ground is subsequently removed, the alarm will retire within five seconds.

5. Calling party holding—After disconnect, if the calling party holds the line for a predetermined time, the AIS interface enters an alarm mode for signalling that despite a disconnect, the line is still being held. There are a plurality selectable time-outs.

6. Remote make busy—If the E lead is grounded, i.e., off-hook, for longer than two minutes, an alarm will result. Recovery is automatic within five seconds of removal of ground.

While the embodiment of the present invention which have been disclosed herein are the preferred forms and believed to be the best mode of practicing the present invention of providing an interface to a remote AIS for an EM central office, other embodiments, methods or apparatus, may suggest themselves to persons skilled in the art in view of this disclosure. Accordingly, the scope of the present invention should be limited only by the claims below.

What is claimed is:

1. Apparatus for connecting an electromechanical central office to a remotely located automatic intercept system (AIS) configured for receiving intercepted telephone calls and for providing an intercept message, comprising:
   means for receiving a plurality of sleeve leads, said sleeve leads being associated with a plurality of called numbers for which an intercept message is to be delivered when a calling party calls one of said called numbers;
   means for continuously scanning said sleeve leads for an incoming call to one of said called numbers and for detecting a seizure condition on a particular one of said sleeve leads receiving said incoming call;
   means responsive to a seizure detected by said scanning means for connecting an intercept trunk to said incoming call, said intercept trunk being connected to a facility having an AIS; and
   means for transmitting said called number to said AIS to cause said AIS to play back an intercept message corresponding to said called number,
   whereby the AIS plays back an intercept message via said intercept trunk to the calling party.

2. The apparatus of claim 1, further comprising means for making all sleeves busy with the exception of said particular one of said sleeve leads.

3. The apparatus of claim 1, wherein said transmitting means transmits said called number to said AIS via multifrequency signalling.

4. The apparatus of claim 1, further comprising signaling means for communicating telephone network control signals from said electromechanical central office to said AIS facility.

5. The apparatus of claim 4, wherein said signaling means comprises loop signaling means.

6. The apparatus of claim 4 wherein said signaling means comprises E&M signaling means.

7. The apparatus of claim 6, further comprising wink responsive means for detecting a wink signal from said AIS, and wherein said called number is transmitted in response to said wink signal.

8. The apparatus of claim 1, further comprising second means for making all sleeves busy in response to detection of a busy condition on said intercept trunk.

9. The apparatus of claim 8, wherein said second busy means is operative to detect sais busy condition on said intercept trunk and make all sleeves busy to prevent said intercept trunk connecting means form attempting to connect said intercept trunk.

10. The apparatus of claim 1, further comprising memory means for storing said called number in association with a sleeve lead number, and wherein said transmitting means is operative to retrieve said called number from said memory means and transmit same in response to detection of seizure by said scanning means.

11. The apparatus of claim 10, further comprising programming means for programming said memory means to associate sleeve lead numbers with said called numbers.

12. The apparatus of claim 11, wherein said programming means comprises a DTMF telephone.

13. The apparatus of claim 1, further comprising programmed microcomputer means responsive for controlling said scanning means for scanning said sleeve leads, detecting a seizure condition on said particular one of said sleeve leads, connecting said intercept trunk to said incoming call, and transmitting said called number to said AIS.

14. The apparatus of claim 1, wherein said connecting means comprises switching means for making an audio connection between said intercept trunk and an incoming trunk carrying said incoming call.

15. The apparatus of claim 1, further comprising means for connecting remote office test line (ROTL) and centralized automatic reporting on trunk (CAROT) equipment to said intercept trunk for testing.

16. A method for delivering an intercept message from a remote automatic intercept system (AIS) to a caller to a telephone number for which an intercept message is indicated, comprising the steps of:
providing a point of termination for a plurality of sleeve leads of telephone numbers for which an intercept message is to be delivered when a call is received over an incoming trunk;
continuously scanning said sleeve leads at said point of termination for an incoming call to a particular one of said called numbers and detecting a seizure condition on said incoming trunk;
in response to detection of a call to said particular one of said called numbers, connecting an outgoing trunk to the incoming call, the outgoing trunk being connected to a facility having an AIS;
providing data corresponding to said particular one of said called numbers to the AIS via said outgoing trunk to cause the AIS to generate an intercept message appropriate for said particular one of said called numbers; and
providing the intercept message generated by the AIS to the incoming call.

17. The method of claim 16, further comprising the step of making all sleeves busy with the exception of the sleeve associated with said particular one of said called numbers.

18. The method of claim 16, wherein the step of providing data corresponding to said particular one of said called numbers to the AIS comprises transmitting the telephone number corresponding to said particular one of said called numbers by multifrequency signalling.

19. The method of claim 16, wherein the method is performed in an electromechanical central office.

20. The method of claim 19, further comprising the step of communicating telephone network control signals from the electromechanical central office to the AIS facility.

21. The method of claim 20, wherein the step of communicating telephone network control signals comprises usage of multifrequency signaling.

22. The method of claim 20, wherein the step of communicating telephone network control signals comprises signaling with loop signaling.

23. The method of claim 20, wherein the step of communicating telephone network control signals comprises signaling with E&M signaling.

24. The method of claim 16, further comprising the step of making all sleeve leads busy in response to detection of a busy condition on said intercept trunk.

25. The method of claim 24, wherein the step of making all sleeves busy in response to detection of a busy condition on said intercept trunk is carried out before the step of connecting an outgoing trunk to the incoming call so that all incoming calls receive a busy signal and are not connected to an outgoing trunk.

26. The method of claim 16, further comprising the step of storing telephone numbers for which an intercept message is to be delivered in associated with sleeve lead numbers.

27. The method of claim 26, wherein the step of providing data corresponding to said particular one of said called numbers to the AIS comprises retrieving a particular one of telephone numbers from said memory means and transmitting same to the AIS.

28. The method of claim 26, wherein the step of step of storing telephone numbers in association with sleeve lead numbers is performed with a DTMF telephone.

29. In an elecromechanical central office, apparatus for connecting an incoming call intended for a number for which an intercept message is indicated to a remotely located automatic intercept system (AIS) configured for receiving intercepted telephone calls and for providing an intercept message, comprising:
terminal means for providing a point of termination for a plurality of sleeve leads, said sleeve leads being associated with a plurality of called numbers for which an intercept message is to be delivered when a calling party calls one of said called numbers;
trunk scanning means for continuously scanning said sleeve leads connected to said terminal means for an active sleeve indicative of an incoming call on an incoming trunk to a particular one of said called numbers for providing a service request signal in response to detection of said active sleeve;
busy means responsive to said service request signal for making all of said telephone numbers busy with the exception of said incoming call on said incoming trunk;
programmable memory means for storing sleeve lead numbers in association with said plurality of called numbers for which an intercept message is to be delivered when a calling party calls;
means responsive to said service request signal for recalling a telephone number associated with a sleeve lead number associated with said active sleeve from said memory means;

means responsive to said service request signal for seizing an intercept trunk connected to a remote AIS facilty;

switching means for switching the audio path of incoming trunk to said intercept trunk;

means for providing a multifrequency spill of signals corresponding to said telephone number retrieved by said recalling means onto said audio path and to said remote AIS; and disconnect means for disconnecting the audio path of said incoming trunk from said intercept trunk, for making all busy sleeves idle, and for releasing said intercept trunk in response to completion of delivery of an intercept message by said remote AIS.

30. The apparatus of claim 29, wherein said trunk scanning means, said recalling means, said switching means, said seizing means, said multifrequency signal providing mans, and said disconnect means are controlled by a programmed microprocessor.

31. The apparatus of claim 29, further comprising means for connecting remote office test line (ROTL) and centralized automatic reporting on trunk (CAROT) equipment to said intercept trunk for testing.

32. In an electromechanical central office, apparatus for connecting an incoming call intended for a number for which an intercept message is indicated to a remotely located automatic intercept system (AIS) configured for receiving intercepted telephone calls and for providing an intercept message, comprising:

terminal means for providing a point of termination for a plurality of sleeve leads being associated with a plurality of called numbers for which an intercept message is to be delivered when a calling party calls one of said called numbers;

a plurality of trunk scanner circuits, each of said trunk scanner circuits being connected to detect an active sleeve indicative of an incoming call on an incoming trunk and for providing a sleeve signal;

multiplexing means for multiplexing a plurality of sleeve signals from said plurality of said trunk scanner circuits;

a programmed microcomputer for scanning said plurality of sleeve signals being provided by said multiplexer means and being responsive to provide a service request signal in response to detection of an active sleeve;

busy means repsonsive to said service request signal for making all sleeves connected to said terminal means busy with the exception of said incoming call on said incoming trunk;

programmable memory means for storing sleeve lead numbers in association with said plurality of called numbers for which an intercept message is to be believed when a calling party calls;

means for programming said memory means with telephone numbers corresponding to said plurality of called numbers for which an intercept message is to be delivered when a calling party calls;

said programmed microcomputer being operative for recalling and providing a telephone number associated with a sleeve lead number associated with said active sleeve from said memory means;

said programmed microcomputer being operative for seizing an intercept trunk connected to a remote AIS facility;

switching means for switching the audio path of said incoming trunk to said intercept trunk;

multifrequency signal generating means responsive to a recalled telephone number provided by said programmed microcomputer for generating multifrequency signals corresponding to said recalled telephone number onto said audio path and to said remote AIS; and disconnect means for disconnecting the audio path of said incoming trunk from said intercept trunk, for making all busy sleeves idle, and for releasing said intercept trunk in response to completion of delivery of an intercept message by said remote AIS.

33. Apparatus for connecting an electromechanical central office for operating with remote office test line (ROTL) and centralized automatic reporting on trunk (CAROT) equipment, comprising:

means for receiving a sleeve lead corresponding to a predetermined telephone number corresponding to an incoming call from CAROT equipment;

means for continuously scanning said sleeve lead for an incoming call to said predetermined telephone number and for detecting a seizure condition on said sleeve lead receiving said incoming call;

means responsive to a seizure detected by said scanning means for connecting said incoming call to an outgoing trunk to be tested;

means for connecting ROTL equipment to said outgoing trunk; and constant current means connected to said outgoing trunk in response to connection of said ROTL equipment for providing a balanced high impedance current source to said outgoing trunk so as to minimize loading, whereby the outgoing trunk may be tested by the CAROT system without disturbing network transmission line parameters.

34. The apparatus of claim 33, wherein said constant current means comprises a constant current sink connected to the tip (T) line of said outgoing trunk and a constant current source connected to the ring (R) line of said outgoing trunk.

35. The apparatus of claim 33, wherein said constant current source comprises an NPN transistor, means for providing a constant biasing current to the base of said NPN transistor, a resistor connected between the emitter said NPN transistor and said power supply voltage, and means connected between the collector and ground for holding the voltage at the collector at a constant voltage, and wherein the collector of said NPN transistor is connected to the ring line of said outgoing trunk.

36. The apparatus of claim 33, wherein said constant current sink comprises a PNP transistor, means for providing a constant biasing current to the base of said PNP transistor, a resistor connected between the emitter of said PNP transistor and ground, and means connected between the collector and ground for holding the voltage at the collector at a constant voltage, and wherein the collector of said PNP transistor is connected to the tip line of said outgoing trunk.

* * * * *